US011531610B2

(12) United States Patent
Qiao et al.

(10) Patent No.: US 11,531,610 B2
(45) Date of Patent: Dec. 20, 2022

(54) TIME COST ESTIMATION FOR ACTIVITY FEED NOTIFICATIONS

(71) Applicant: Citrix Systems, Inc., Fort Lauderdale, FL (US)

(72) Inventors: Zongpeng Qiao, Nanjing (CN); Bo Chen, Nanjing (CN); Xiao Zhang, Nanjing (CN); Jie Zhuang, Nanjing (CN)

(73) Assignee: Citrix Systems, Inc., Fort Lauderdle, FL (US)

( * ) Notice: Subject to any disclaimer, the term of this patent is extended or adjusted under 35 U.S.C. 154(b) by 394 days.

(21) Appl. No.: 16/744,465

(22) Filed: Jan. 16, 2020

(65) Prior Publication Data

US 2021/0182171 A1 Jun. 17, 2021

Related U.S. Application Data

(63) Continuation of application No. PCT/CN2019/125840, filed on Dec. 17, 2019.

(51) Int. Cl.
*G06F 11/34* (2006.01)
*G06F 9/54* (2006.01)

(52) U.S. Cl.
CPC .......... *G06F 11/3438* (2013.01); *G06F 9/542* (2013.01); *G06F 11/3419* (2013.01)

(58) Field of Classification Search
CPC .. G06F 9/542; G06F 11/3438; G06F 11/3419; G06F 9/451
See application file for complete search history.

(56) References Cited

U.S. PATENT DOCUMENTS

| | | | | |
|---|---|---|---|---|
| 11,238,380 | B1 * | 2/2022 | Perry | G06Q 10/063116 |
| 2006/0167736 | A1 * | 7/2006 | Weiss | G06Q 10/06312 705/7.22 |
| 2011/0314404 | A1 | 12/2011 | Kotler et al. | |
| 2016/0077875 | A1 * | 3/2016 | Murata | G06F 9/4887 718/107 |
| 2016/0100037 | A1 | 7/2016 | Van Zutphen et al. | |
| 2017/0185687 | A1 * | 6/2017 | Pai | G06Q 10/101 |
| 2017/0300355 | A1 * | 10/2017 | Noda | G06F 9/485 |
| 2018/0302302 | A1 | 10/2018 | Doggett et al. | |
| 2019/0180218 | A1 * | 6/2019 | Vigneswaran | G06Q 10/0633 |

FOREIGN PATENT DOCUMENTS

| | | | | |
|---|---|---|---|---|
| KR | 20180006446 A * | 1/2018 | | G06F 9/542 |
| WO | 2012092556 A2 | 5/2012 | | |

OTHER PUBLICATIONS

International Search Report and Written Opinion dated Sep. 23, 2020 for International Patent Application No. PCT/CN2019/125840.

* cited by examiner

*Primary Examiner* — Charles E Anya
(74) *Attorney, Agent, or Firm* — Pierce Atwood LLP

(57) ABSTRACT

Disclosed is a method involving identifying a first activity a user is to complete using a computing resource; causing a client device operated by the user to output a first notification concerning the first activity, the first notification including at least one first user interface element with which the user can interact to begin the first activity; determining an estimated time for the user to complete the first activity; and causing the client device to output an indication of the estimated time in association with the first notification.

20 Claims, 16 Drawing Sheets

500
424
Resource Access Application
502
Activity Time Reporting Engine
Activity Time Determination Engine
506
438
Analytics Service
504
510
Activity Time Reporting Service
Database
Activity Time Estimation Service
508

902

| User ID | Activity Type | Weight 1 | Weight 2 | ... | Weight Y | Average Weight |
|---|---|---|---|---|---|---|
| User A | Type SA | 0.9 | 1.1 | ... | 2.0 | 1.3 |
| User A | Type SB | 0.7 | 0.6 | | 0.9 | 0.8 |
| ... | | ... | | | ... | |
| User A | Type SM | 1.2 | 1.4 | ... | 1.1 | 1.2 |

| User ID | Activity Type | Duration 1 | Duration 2 | ... | Duration X | Average Duration |
|---|---|---|---|---|---|---|
| User A | Type CA | 25 mins | 45 mins | ... | 40 mins | 37 mins |
| User A | Type CB | 8 mins | 3 mins | | 7 mins | 5 mins |
| ... | | ... | | | ... | |
| User A | Type CN | 33 mins | 17 mins | ... | 18 mins | 24 mins |

TIME COST ESTIMATION FOR ACTIVITY FEED NOTIFICATIONS

CROSS-REFERENCE TO RELATED APPLICATIONS

This application is a continuation of and claims the benefit under 35 U.S.C. § 120 and 35 U.S.C. § 365(c) to International Application PCT/CN2019/125840, entitled TIME COST ESTIMATION FOR ACTIVITY FEED NOTIFICATIONS, with an international filing date of Dec. 17, 2019, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is an intelligent activity feed for a user's many applications. Such an activity feed provides a streamlined mechanism for notifying a user of various application events in need of attention and allowing the user to efficiently act on such events, without requiring the user to switch context and separately launch the respective applications to take actions with respect to the different events.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises identifying a first activity a user is to complete using a computing resource; causing a client device operated by the user to output a first notification concerning the first activity, the first notification including at least one first user interface element with which the user can interact to begin the first activity; determining an estimated time for the user to complete the first activity; and causing the client device to output an indication of the estimated time in association with the first notification.

In some disclosed embodiments, a system comprises at least one processor, and at least one computer-readable medium encoded with instructions which, when executed by the at least one processor, cause the system to identify a first activity a user is to complete using a computing resource, to cause a client device operated by the user to output a first notification concerning the first activity, the first notification including at least one user interface element with which the user can interact to begin the first activity, to determine an estimated time for the user to complete the first activity, and to cause the client device to output an indication of the estimated time in association with the first notification.

In some disclosed embodiments, at least one non-transitory computer-readable medium is encoded with instructions which, when executed by at least one processor included in a system, cause the system to identify a first activity a user is to complete using a computing resource, to cause a client device operated by the user to output a first notification concerning the first activity, the first notification including at least one user interface element with which the user can interact to begin the first activity, to determine an estimated time for the user to complete the first activity, and to cause the client device to output an indication of the estimated time in association with the first notification.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 9A shows a first example table that may be stored in the database shown in FIG. 5;

FIG. 9B shows a first example table that may be stored in the database shown in FIG. 5;

DETAILED DESCRIPTION

For purposes of reading the description of the various embodiments below, the following descriptions of the sections of the specification and their respective contents may be helpful:

Section A provides an introduction to example embodiments of systems for providing time cost estimates for notifications in an activity feed;

Section B describes a network environment and computing environment which may be useful for practicing embodiments described herein;

Section C describes embodiments of systems and methods for delivering shared resources using a cloud computing environment;

Section D describes embodiments of systems and methods for managing and streamlining access by clients to a variety of resources;

Section E provides a detailed description of example embodiments of systems for providing time cost estimates for notifications in an activity feed; and Section F describes example implementations of methods, systems/devices, and computer-readable media in accordance with the present disclosure.

Figure 1A:
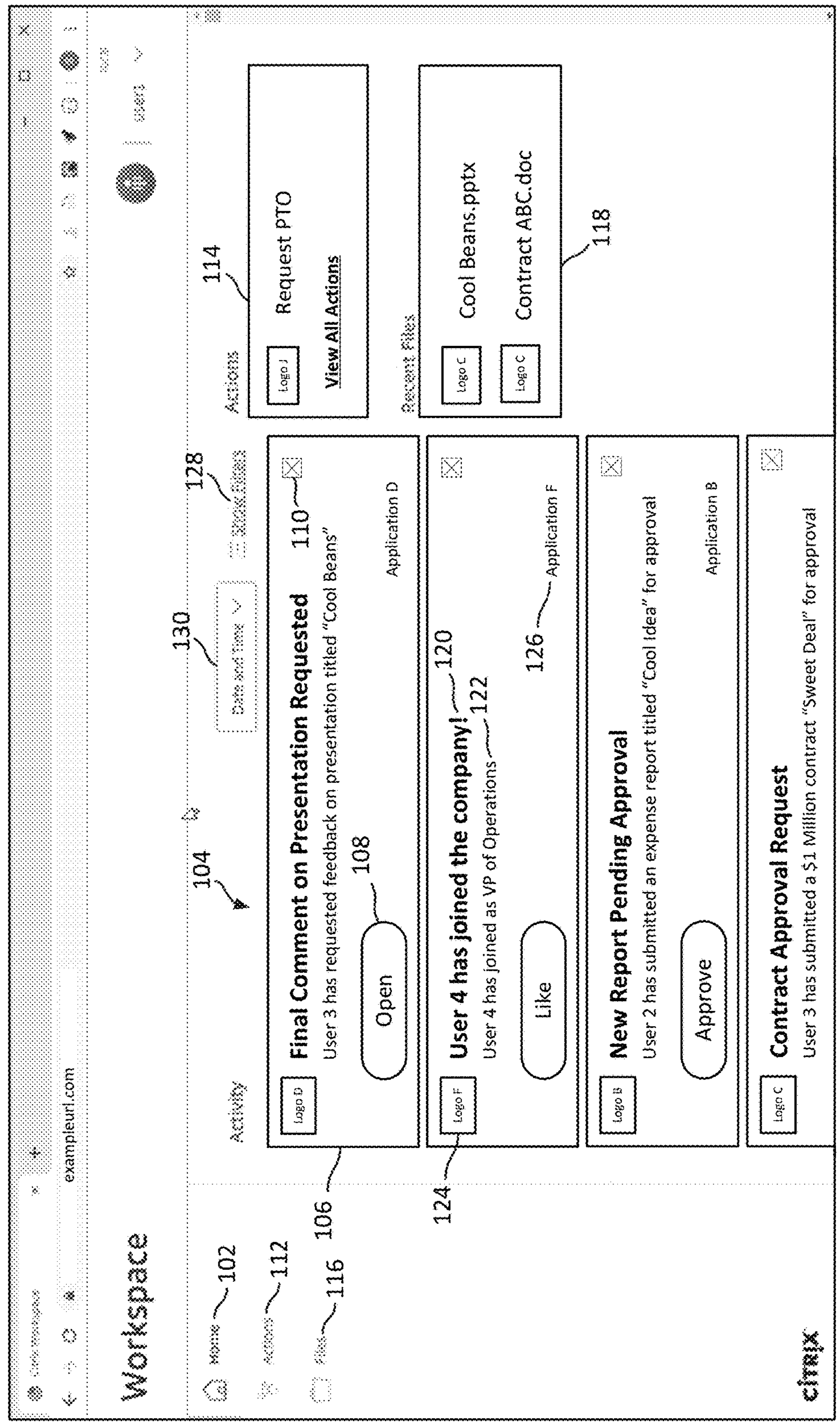
FIG. 1A shows how a display screen may appear when an intelligent activity feed feature of a multi-resource management system, such as Citrix Workspace™, is employed.

A. Introduction to Illustrative Embodiments of a System for Providing Time Cost Estimates for Notifications in an Activity Feed FIG. 1A shows how a display screen 100 of a multi-resource access system, such as Citrix Workspace™, may appear when an intelligent activity feed feature is employed and a user is logged on to the system. Such a screen may be provided, for example, when the user clicks on or otherwise selects a "home" user interface element 102. As shown, an activity feed 104 may be presented on the screen 100 that includes a plurality of notifications 106 about respective events that occurred within various applications to which the user has access rights. An example implementation of a system capable of providing an activity feed 104 like that shown is described in Section D below in connection with FIG. 4C. As explained in Section D, a user's authentication credentials may be used to gain access to various systems of record (e.g., SalesForce, Ariba, Concur, RightSignature, etc.) with which the user has accounts, and events that occur within such systems of record may be evaluated to generate notifications 106 to the user concerning actions that the user can take relating to such events. As shown in FIG. 1A, in some implementations, each notification 106 may include a title 120 and a body 122, and may also include a logo 124 and/or a name 126 of the system or record to which the notification 106 corresponds, thus helping the user understand the proper context with which to decide how best to respond to the notification 106.

In some implementations, one of more filters may be used to control the types, date ranges, etc., of the notifications 106 that are presented in the activity feed 104. The filters that can be used for this purpose may be revealed, for example, by clicking on or otherwise selecting the "show filters" user interface element 128. Further, in some embodiments, a user interface element 130 may additionally or alternatively be employed to select a manner in which the notifications 106 are sorted within the activity feed. In some implementations, for example, the notifications 106 may be sorted in accordance with the "date and time" they were created (as shown for the element 130 in FIG. 1A) and/or an "application" mode (not illustrated) may be selected (e.g., using the element 130) in which the notifications 106 may be sorted by application type.

When presented with such an activity feed 104, the user may respond to each notification 106 by clicking on or otherwise selecting a corresponding action element 108, or by dismissing the notification, e.g., by clicking on or otherwise selecting a "close" element 110. As explained in connection with FIG. 4C below, each of the notifications 106 and corresponding action elements 108 may be implemented, for example, using a "microapp" that can read and/or write data to a system of record using application programming interface (API) functions or the like, rather than by performing a full launch of the application for that system of record. In some implementations, a user may additionally or alternatively view additional details concerning the event that triggered the notification and/or may access additional functionality enabled by the microapp corresponding to the notification 106 (e.g., in a separate pop-up window corresponding to the microapp) by clicking on or otherwise selecting a portion of the notification 106 other than one of the user-interface elements 108, 110.

In some embodiments, the user may additionally or alternatively be able to select a user interface element either within the notification 106 or within a separate window corresponding to the microapp that allows the user to launch the native application to which the notification relates and respond to the event that prompted the notification via that native application rather than via the microapp. In addition to the event-driven actions accessible via the action elements 108 in the notifications 106, a user may alternatively initiate microapp actions by selecting a desired action, e.g., via a drop-down menu accessible using the "action" user-interface element 112 or by selecting a desired action from a list 114 of recently and/or commonly used microapp actions. As shown, the user may also access files (e.g., via a Citrix ShareFile™ platform) by selecting a desired file, e.g., via a drop-down menu accessible using the "files" user interface element 116 or by selecting a desired file from a list 118 of recently and/or commonly used files.

Although not shown in FIG. 1A, it should be appreciated that, in some implementations, additional resources may also be accessed through the screen 100 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 1A provides significant benefits, as it allows a user to respond to application-specific events generated by disparate systems of record without needing to navigate to, launch, and interface with each of several different native applications. The inventors have recognized and appreciated, however, that users may encounter difficulties determining the order in which the notifications 106 in the activity feed 104 are to be addressed, particularly when a presented with a large number of notifications, because users might not have a sense as to how long it is likely take to address the different types of notifications presented in the feed.

Offered is a technique for determining time estimates for completing tasks corresponding the respective notifications 106 and taking some action using such time estimates to optimize the user's ability to interact with the activity feed 104. One example of an action that may be taken to optimize the user's ability to interact with the activity feed 104 is presenting the estimates to the user in association with such notifications 106. By accompanying the notifications 106 with such time estimates, users may be able to more efficiently and effectively interact with the notification feed 104 and optimize the order in which the user addresses the respective notifications 106.

In some embodiments, the determined time estimates may additionally or alternatively be used to prioritize, sort, and/or filter the notifications 106 in the activity feed 104, e.g., based on sorting/filtering options selected by a user via the user interface elements 128, 130 or otherwise, and/or based on entries in a user's calendar, so as to optimize the manner in which the notifications are presented in the activity feed in accordance with time constraints and/or preferences of the user to whom the activity feed 104 is presented.

Further, in some embodiments, the determined time estimates may additionally or alternatively be utilized by virtual assistance functionality that may be provided, for example, by the resource management services 402 (shown in FIGS. 4A-C), as described below in Section D. For example, a user may simply tell such a virtual assistant that the user has an available time slot (e.g., by indicating "show me tasks I can complete in less than thirty minutes," "I have fifteen minutes, what can I do in that time?", or "what can I get done by the end of the day?", etc.), and the virtual assistant may identify and present to the user one or more notifications 106 relating to tasks the user will likely be able to complete within the specified time slot.

Still further, in some embodiments, the determined time estimates may additionally or alternatively be used to generate one or more reports indicating all of the user's pending tasks and associated time cost estimates. Such a report may, for example, be generated on demand, at the beginning of each day, at the beginning of each week, etc. In some implementations, such a report may also indicate a cumulative estimated time cost for all of the user's pending tasks and may include one or more user interface elements, e.g., check boxes, adjacent the listed tasks that allow the user to identify lower priority tasks that may be postponed. As the user identifies such lower-priority tasks, the cost estimates for such tasks may be subtracted from the cumulative estimated time cost that is presented. Such a technique may thus enable a user to identify the highest priority tasks for the user to complete within a particular window of time corresponding to the remaining cumulative estimated time cost that is presented.

In some embodiments, information may be gathered and stored concerning the amount of time a given user takes to perform particular tasks corresponding to notifications when interacting with the activity feed 104. Such stored information may thereafter be leveraged to determine user-specific time estimates for addressing particular types of notifications 106 that are to be presented in an activity feed 104. As explained in more detail below, in some implementations, different types of notifications may be analyzed in different ways to yield such time estimates. For example, the time needed to complete some types of "simple" tasks, such as reading text, viewing a video, attending an on-line meeting, etc., may depend primarily on a quantity of content (e.g., the number of words, number of video frames, etc.) or other parameter (e.g., scheduled meeting duration) of the content itself. In some embodiments, for such simple tasks, a baseline time estimate may be calculated based on the relevant parameter of the content (e.g., the number of words, number of video frames, scheduled meeting duration, etc.) and a user-specific weighting factor for the particular activity type in question (e.g., reading, viewing video, attending an on-line meeting) may be applied to the baseline time estimate to account for typical behavior of the user. The user to which the notification is directed, for example, may be a slower than average reader, may be a faster than average reader, may tend to view video at a lower than average frame rate, may tend to view video at higher than average frame rate, may tend to pause videos when viewing them, may tend to cut short on-line meetings the user attends, may tend to extend on-line meetings beyond their scheduled duration, etc. The weighted baseline value may then be associated with the notification to give the user a sense of the amount of time it is likely to take for that particular user to complete the activity associated with that particular notification.

The amount of time needed to complete other types of "complex" tasks, such as editing or commenting on a presentation or other document, reviewing and approving an expense report, completing an employee review, etc., may depend primarily on the nature and/or extent of input the user chooses to devote to the task at hand, and may thus not be accurately estimated based on a quantity (e.g., text count, frame count) or other parameter (e.g., scheduled meeting duration) of the content to which the task relates. To estimate the amount of time a user is likely to take to complete such a complex task, historical records of amounts of time it took for that particular user to complete the particular type of task at issue may be accessed, and the estimated time may be set as the average of all such historical values. Additional details concerning the foregoing approaches are provided below in Section E.

Figure 1B:
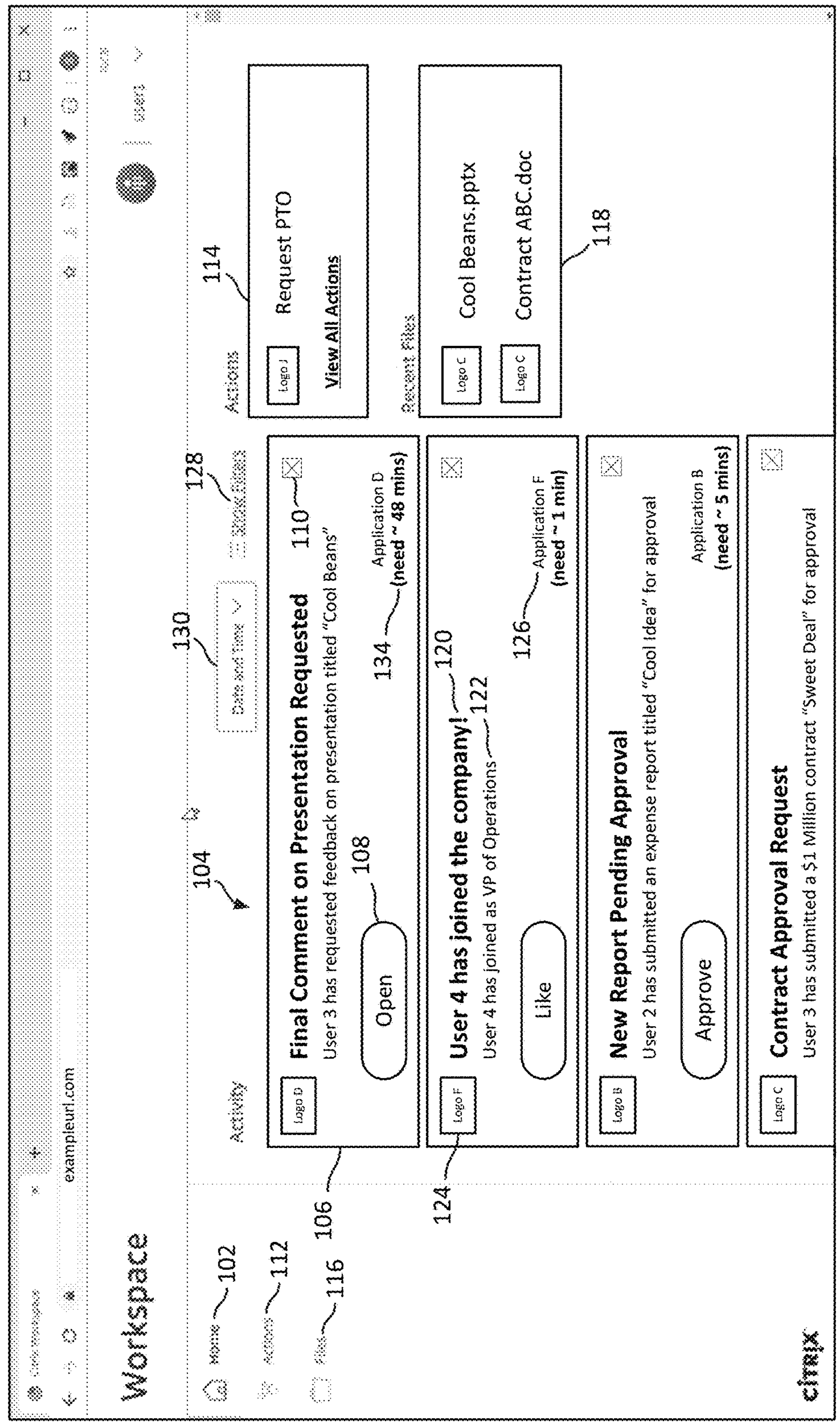
FIG. 1B shows an example of how a display screen may appear when time estimate indicators are displayed in association with respective notifications in the activity feed shown in FIG. 1A.

FIG. 1B shows an example screen 132 that is similar to the screen 100 shown in FIG. 1A but which additionally includes time estimate indicators 134 for the respective notifications 106 in the activity feed 104. In the example shown, the time estimate indicators 134 include numerical values (in minutes) representing the amount of time that is estimated for the user to complete an activity corresponding to a notification 106 after first interacting with the notification 106, such as by initially accessing a microapp associated with the notification 106. As indicated above, in some embodiments, a microapp may be accessed by clicking or otherwise selecting one of the user-interface elements 108, 110 and/or by selecting another portion of the notification 106 so as to cause additional information and/or functionality associated with the microapp to be made accessible.

As used herein, the phrase "complete an activity" refers to a user taking some action that either clears the notification 106 from the activity feed 104 or places the notification 106 in a state that apprises the user that the notification 106 no longer needs the user's attention. A user may complete an activity corresponding to a notification 106, for example, by selecting an action element 108 associated with a micro-app that indicates completion of a task, by launching the full application and taking an action responsive to the event that prompted the notification 106, or by dismissing the notification, such as by clicking a close element 110.

Although not illustrated in FIG. 1B, it should be appreciated that in some embodiments, the order and/or manner in which the notifications 106 are presented in the activity feed 104 may depend in whole or in part on the time estimates that are determined for the respective notifications 106. For example, in some implementations, in response to a user selecting a "high-to-low estimated time" sorting mode for the activity feed 104, e.g., via the user interface element 130, the notifications 106 may be presented in the activity feed 104 so that those notifications 106 with the highest time estimates appear earliest in the feed. Similarly, in response to a user selecting a "low-to-high estimated time" sorting mode for the activity feed 104, e.g., via the user interface element 130, the notifications 106 may be presented in the activity feed 104 so that those notifications 106 with the lowest time estimates appear earliest in the feed. As another example, in response to a user selecting a "calendar-based" sorting mode for the activity feed 104, e.g., via the user interface element 130, the notifications 106 may be presented in the activity feed 104 so that the notifications 106 for which the user currently has sufficient time to complete, e.g., before a next calendar appointment or before the end of the user's workday, may be given a higher priority and thus appear earlier in the activity feed 104 than the notifications 106 the user does not currently have sufficient time to complete based on the commitments reflected in the user's calendar.

In some implementations, one or more filters may additionally or alternatively be made available, e.g., by selecting the user-interface element 128, to allow the user to view only those notifications 106 the user has sufficient time to complete based on the user's current calendar entries, to view only those notifications 106 with time estimates below some predetermined or selectable threshold time estimate, to view only those notifications 106 with time estimates above some predetermined or selectable threshold time estimate, to view only those notifications 106 with time estimates within some predetermined or selectable threshold time estimate window, etc.

Further, as noted above, in some implementations, the notifications 106 that appear in the activity feed 104 may additionally or alternatively be sorted or filtered in response a request to a virtual assistant for tasks meeting one or more criteria, e.g., that can likely be completed within a particular time window, and/or may be sorted or filtered based on a user's interaction with a report that was generated using the determined time cost estimates.

Additional details and example implementations of embodiments of the present disclosure are set forth below in Section E, following a description of example systems and network environments in which such embodiments may be deployed.

B. Network and Computing Environment

Figure 2A:
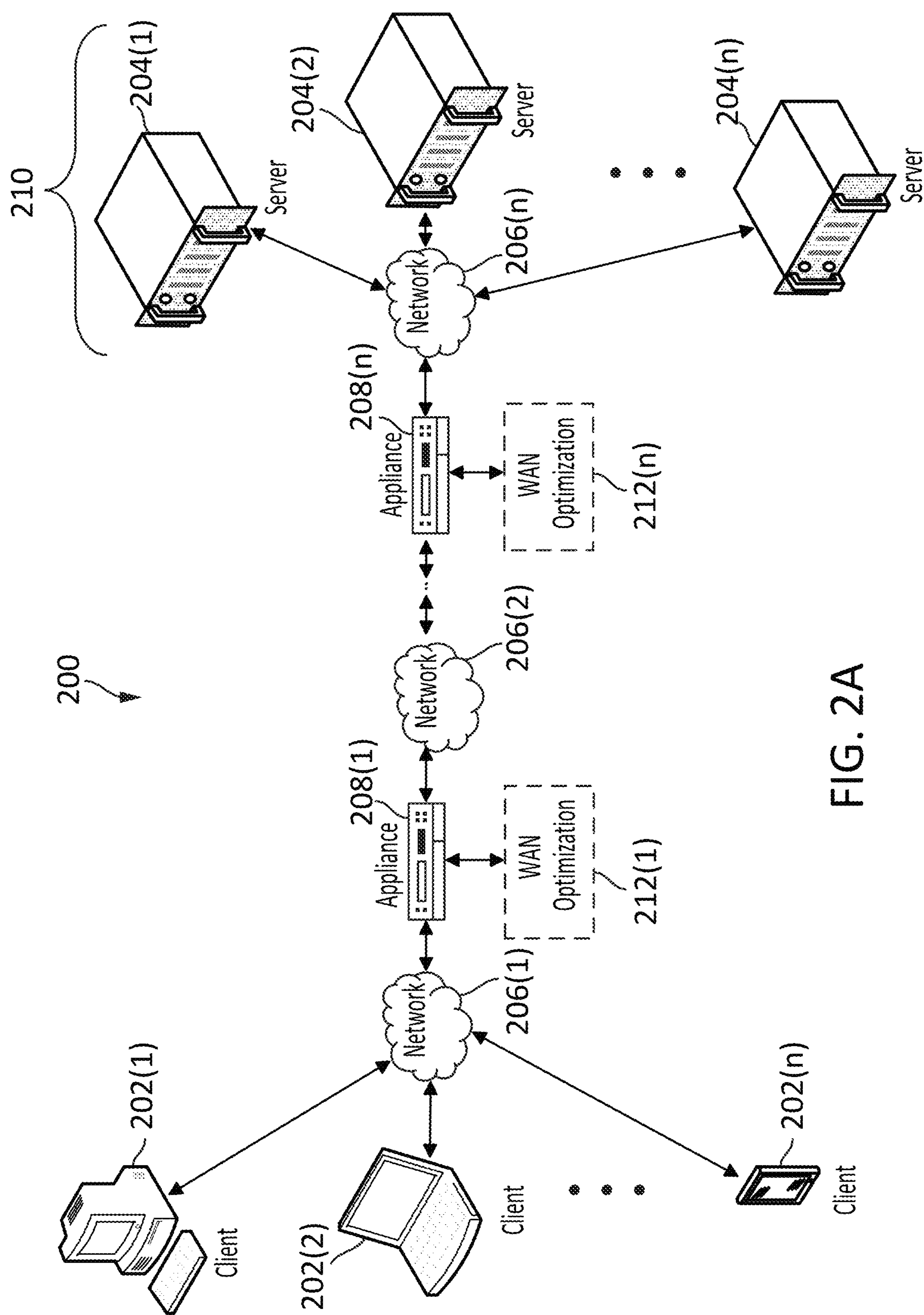
FIG. 2A is a diagram of a network computing environment in which some embodiments of the peripheral device sharing techniques disclosed herein may deployed.

Referring to FIG. 2A, an illustrative network environment 200 is depicted. As shown, the network environment 200 may include one or more clients 202(1)-202(*n*) (also generally referred to as local machine(s) 202 or client(s) 202) in communication with one or more servers 204(1)-204(*n*) (also generally referred to as remote machine(s) 204 or server(s) 204) via one or more networks 206(1)-206(*n*) (generally referred to as network(s) 206). In some embodiments, a client 202 may communicate with a server 204 via one or more appliances 208(1)-208(*n*) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(*n*) may each be a private network such as a local area network (LAN) or a company Intranet, while the network 206(2) may be a public network, such as a metropolitan area network (MAN), wide area network (WAN), or the Internet. In other embodiments, one or both of the network 206(1) and the network 206(*n*), as well as the network 206(2), may be public networks. In yet other embodiments, all three of the network 206(1), the network 206(2) and the network 206(*n*) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(*n*) may be deployed between the network 206(2) and the network 206(*n*). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over interne protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(*n*), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
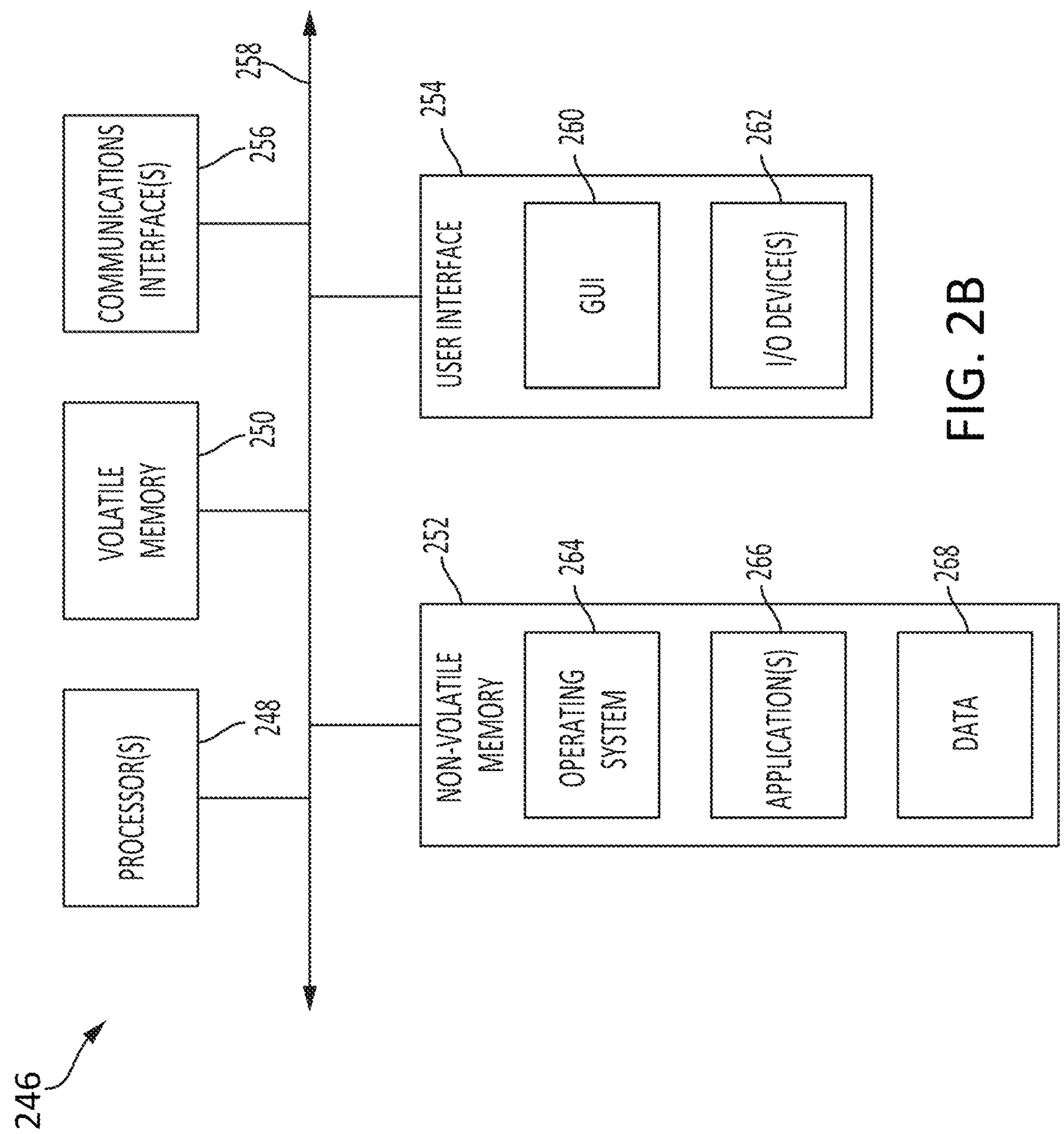
FIG. 2B is a block diagram of a computing system that may be used to implement one or more of the components of the computing environment shown in FIG. 2A in accordance with some embodiments.

FIG. 2B illustrates an example of a computing system 246 that may be used to implement one or more of the respective components (e.g., the clients 202, the servers 204, the appliances 208, 212) within the network environment 200 shown in FIG. 2A. As shown in FIG. 2B, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2B is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
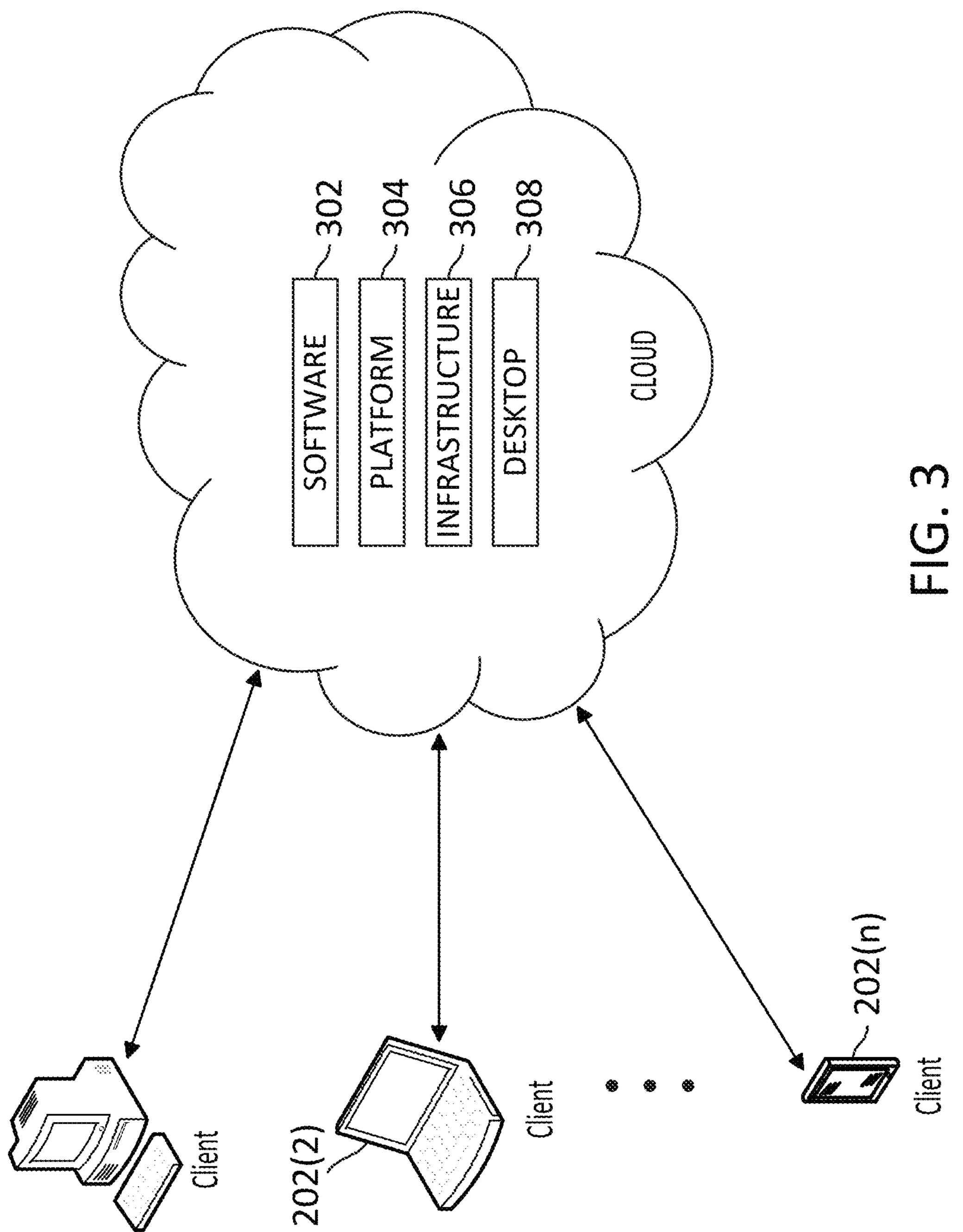
FIG. 3 is a schematic block diagram of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
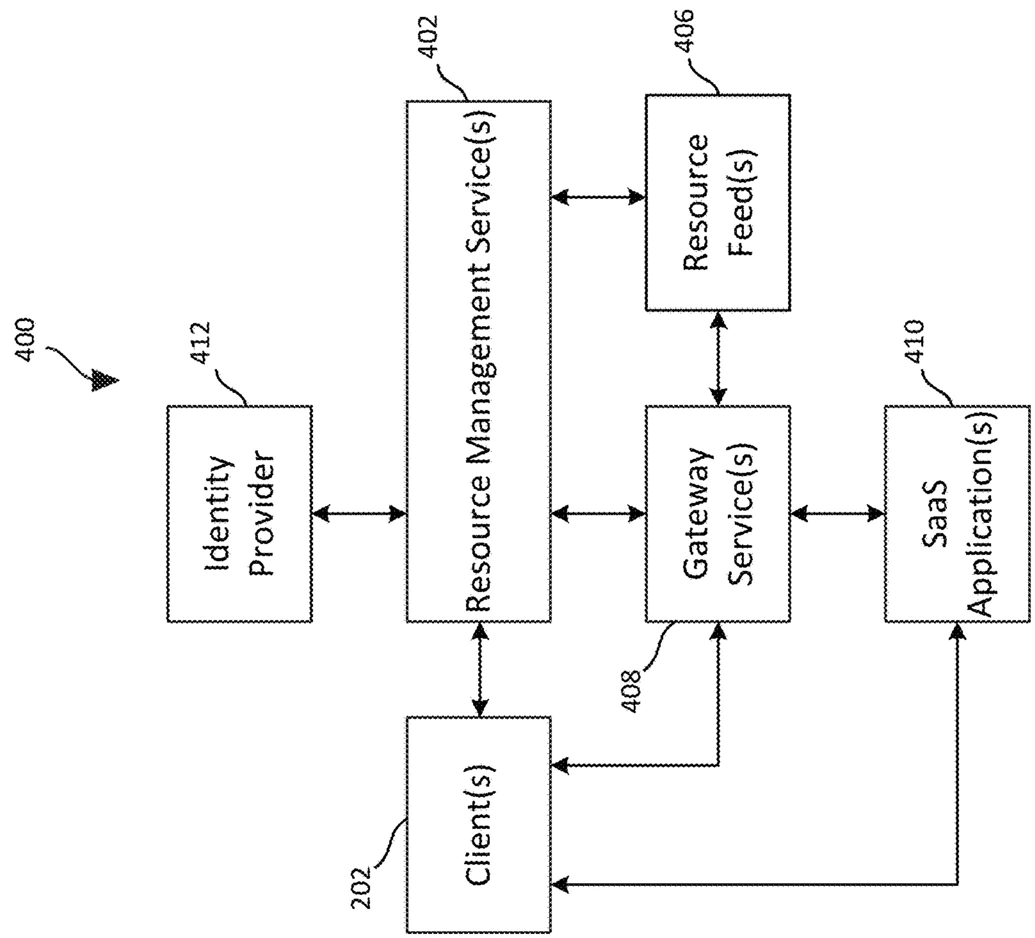
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (e.g., activity feed 104 of FIGS. 1A and 1B) via one or more gateway services 408, and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more interne enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
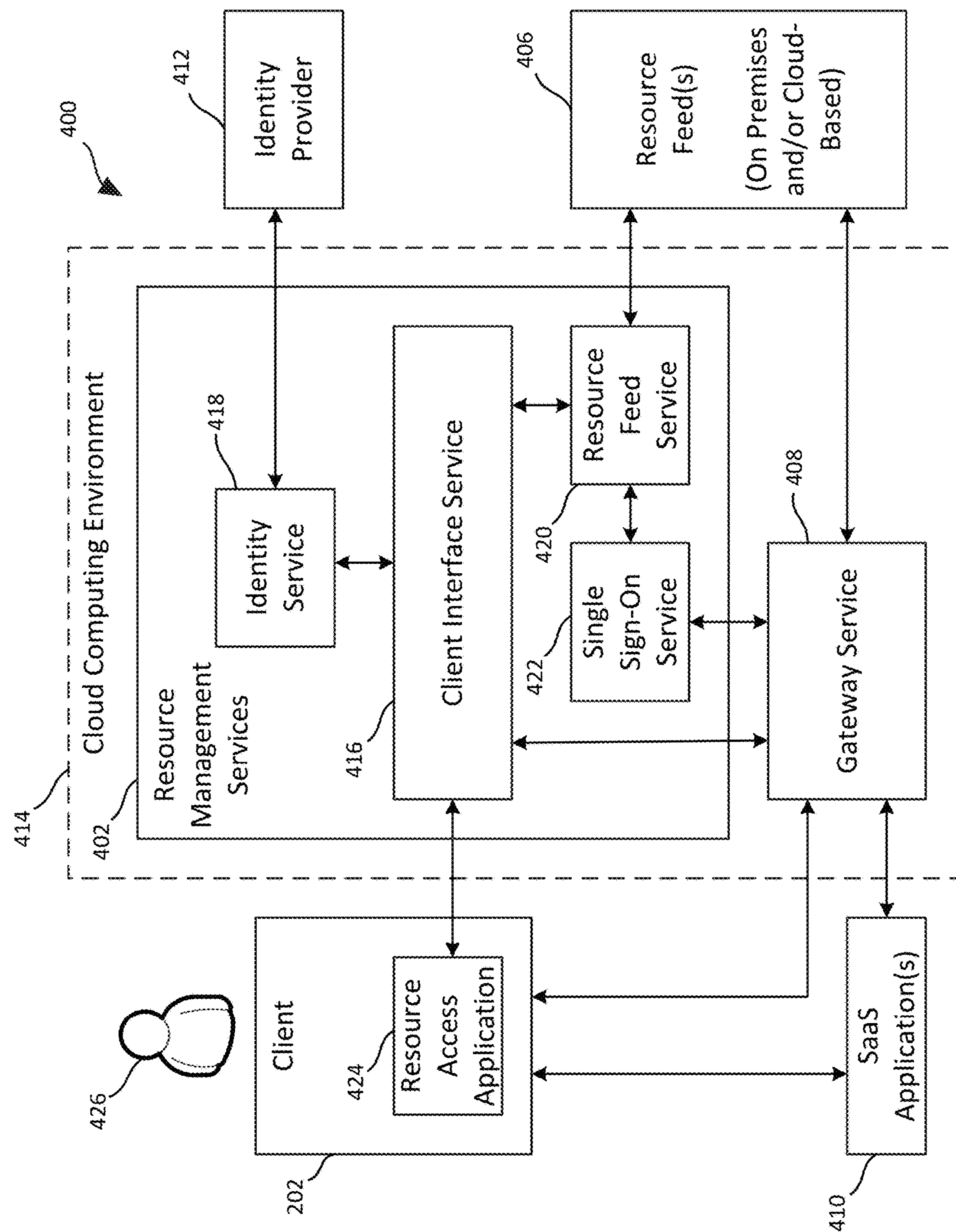
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of the illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more interne enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 to request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource access application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
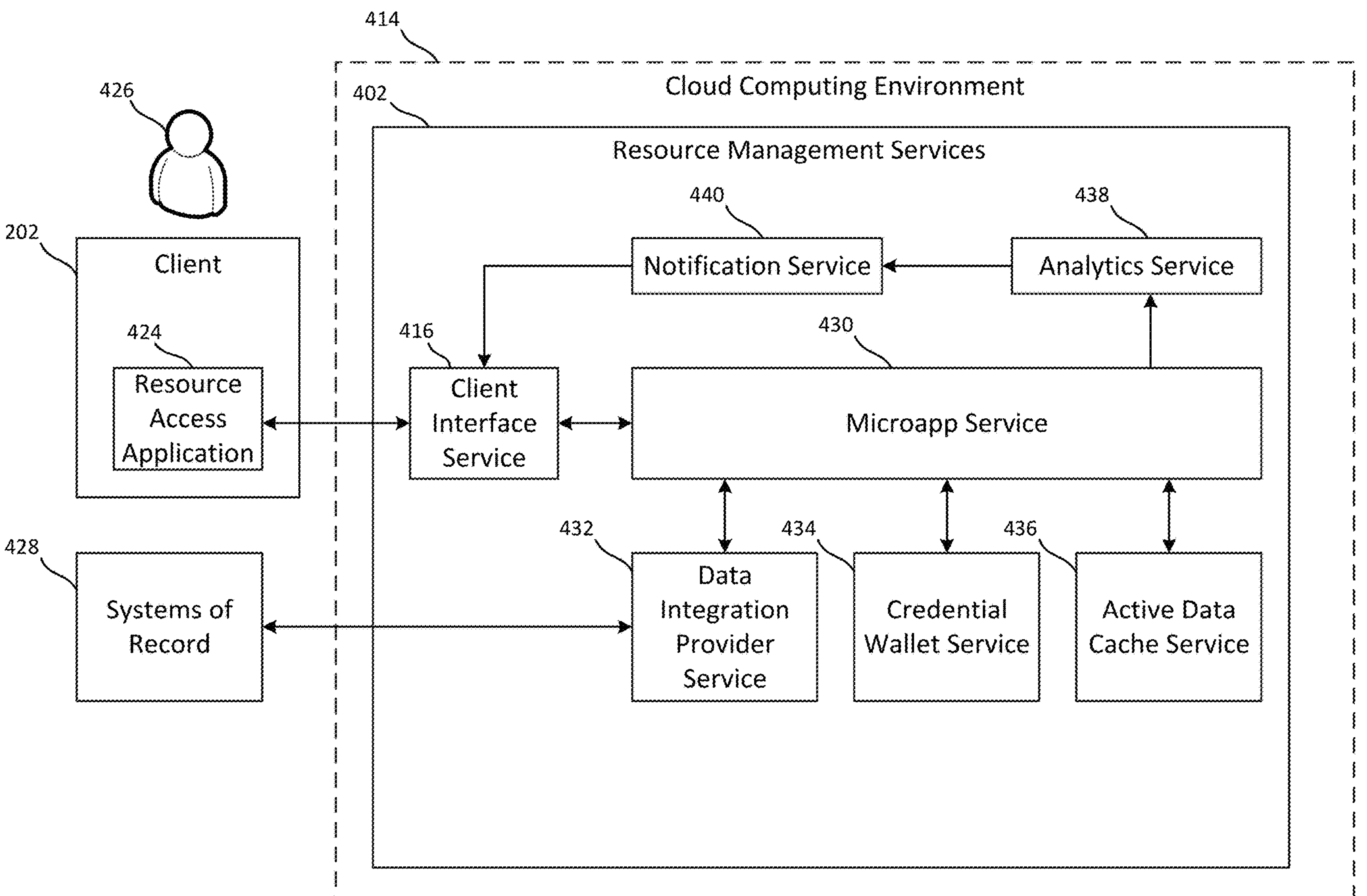
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6 ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapp service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in an activity feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in an activity feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 430 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 424 or directly from another resource, such as Microsoft Teams. This feature may allow employees to work efficiently, stay organized, and deliver only the specific information they're looking for.

Figure 5:
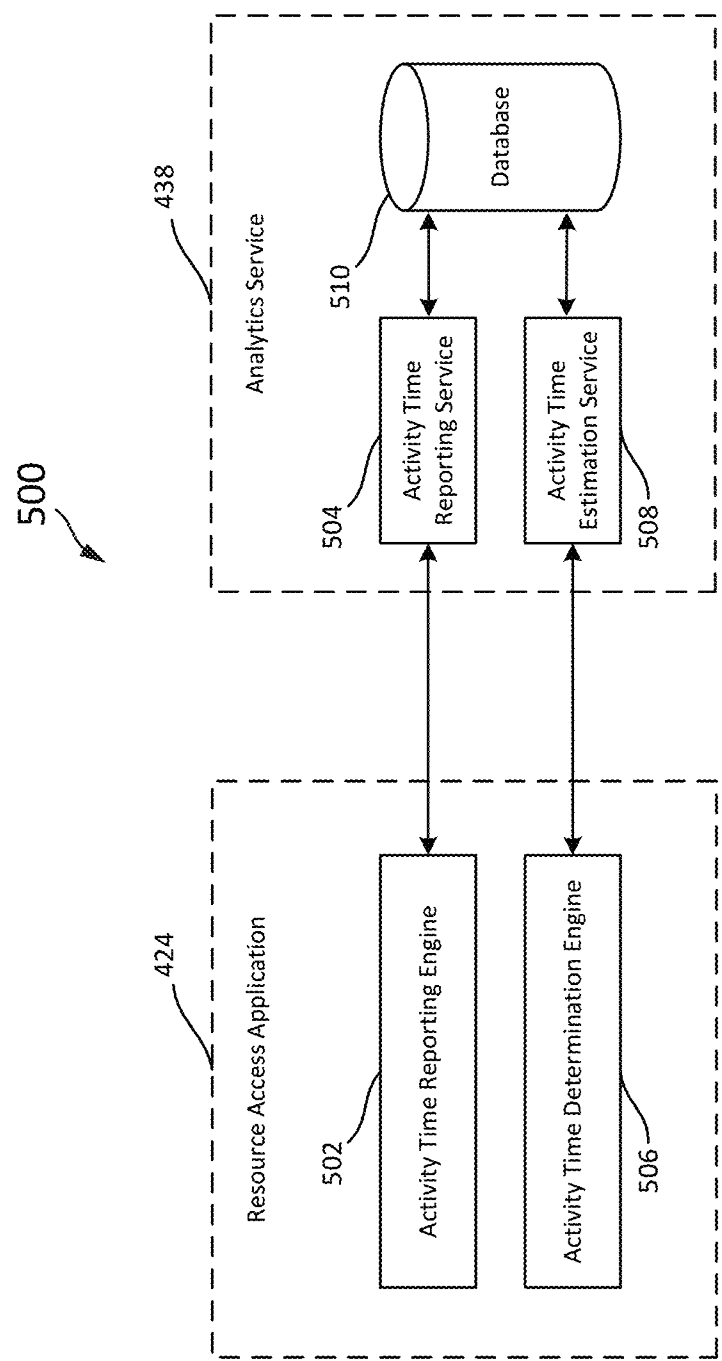
FIG. 5 is a block diagram of an example system for providing time cost estimates for notifications in an activity feed, such as the time estimate indicators shown in FIG. 1B.

E. Detailed Description of Example Embodiments of Systems for Providing Time Cost Estimates for Notifications in an Activity Feed FIG. 5 is a block diagram of an example system 500 for providing time cost estimates for notifications 106 in an activity feed 104, as introduced above in Section A in connection with FIG. 1B. As shown, the system 500 may include an activity time reporting engine 502, an activity time reporting service 504, an activity time determination engine 506, an activity time estimation service 508, and a database 510. At a high level, the activity time reporting engine 502 may be responsible for monitoring the beginning and ending of user interactions with microapps that are associated with notifications 106, and the activity time reporting service 504 may be responsible for determining metrics relating to time spent interacting with the microapps and storing such metrics in the database 510. Also at a high level, the activity time determination engine 506 may be responsible for obtaining activity time estimations from the activity time estimation service 508, as well as including time estimate indicators 134 within activity notifications 106 that are to be included in the activity feed 104, and the activity time estimation service 508 may be responsible for determining appropriate activity time estimates based on the metrics stored in the database 510 by the activity time reporting service 504.

As illustrated, in some embodiments, the activity time reporting engine 502 and the activity time determination engine 506 may both be included within or operate in conjunction with an application executing on a client 202, such as the resource access application 424 described above in connection with FIG. 4C. In some implementations, however, as explained in more detail below, the activity time determination engine 506 may instead be included within or operate in conjunction with a service responsible for generating notifications 106 to be sent to clients 202, such as the analytics service 438 described above in connection with FIG. 4C.

Figure 6:
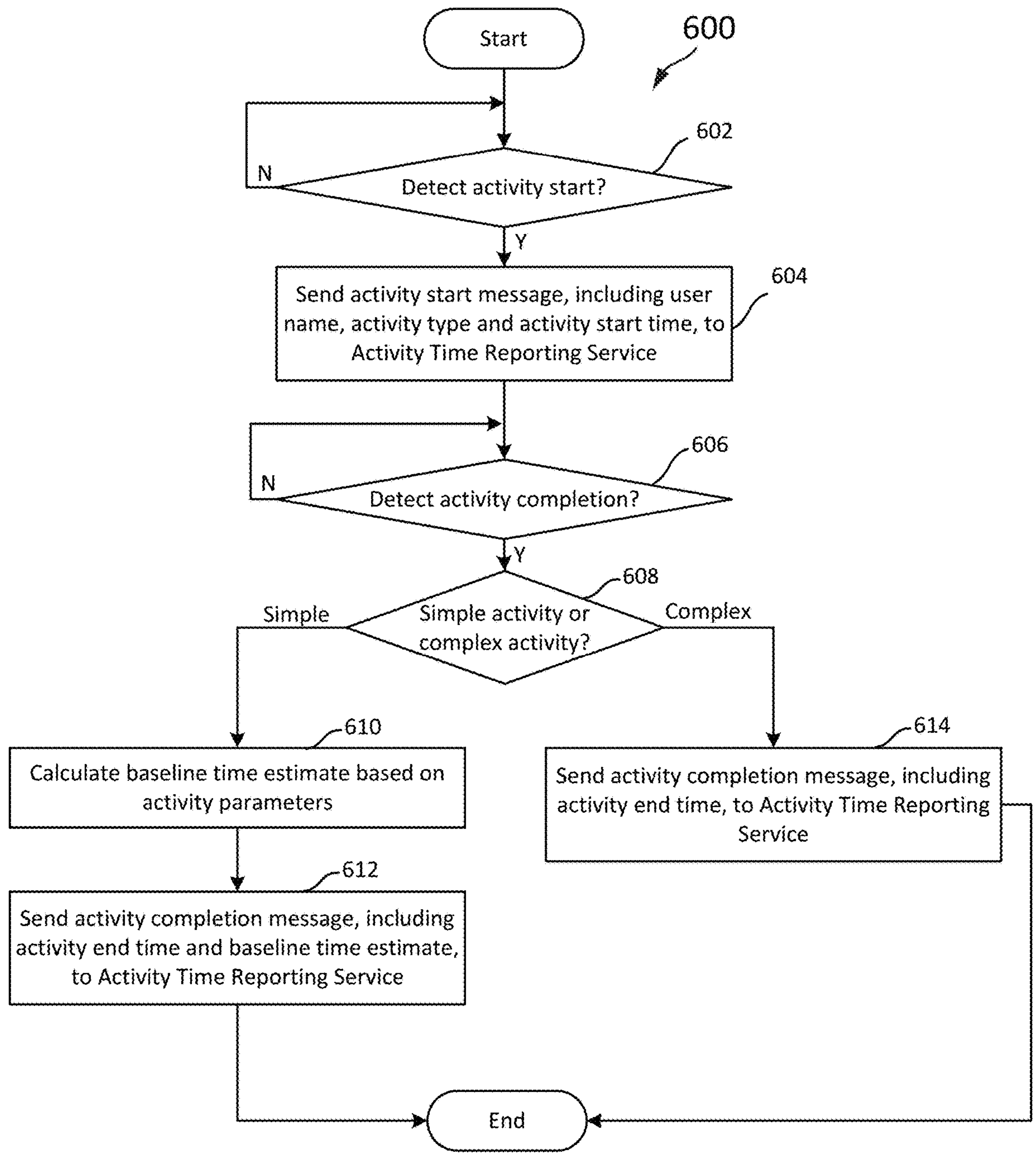
FIG. 6 is a flowchart showing an example routine that may be performed by the activity time reporting engine shown in FIG. 5.
Figure 7:
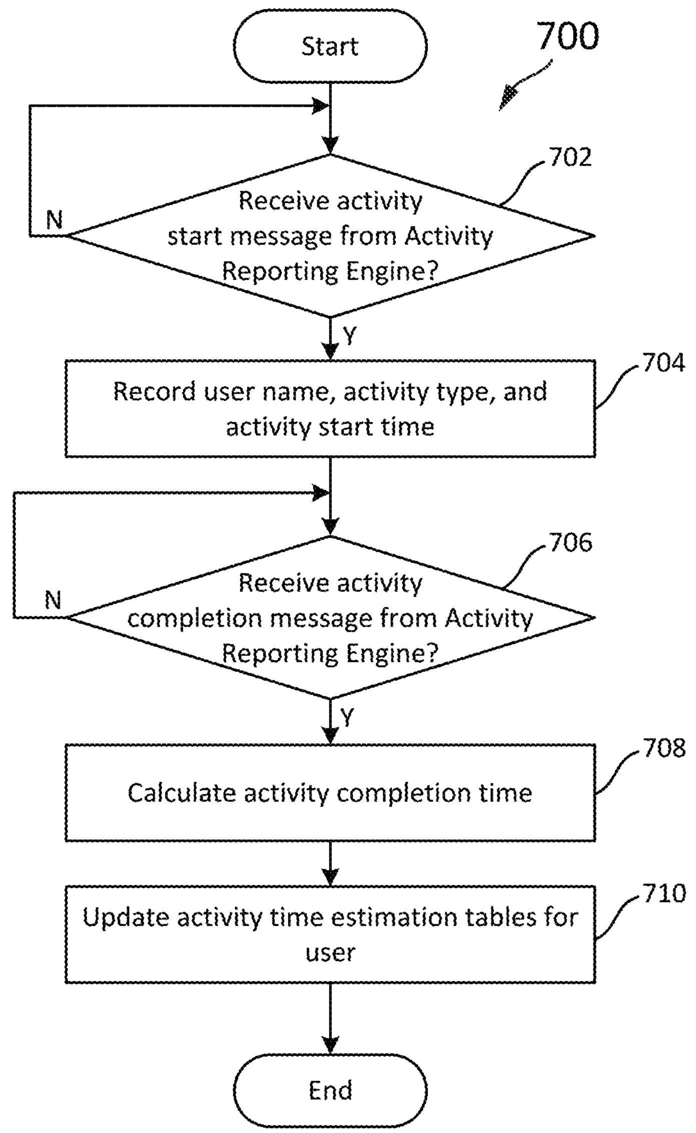
FIG. 7 is a flowchart showing an example routine that may be performed by the activity time reporting service shown in FIG. 5.
Figure 8:
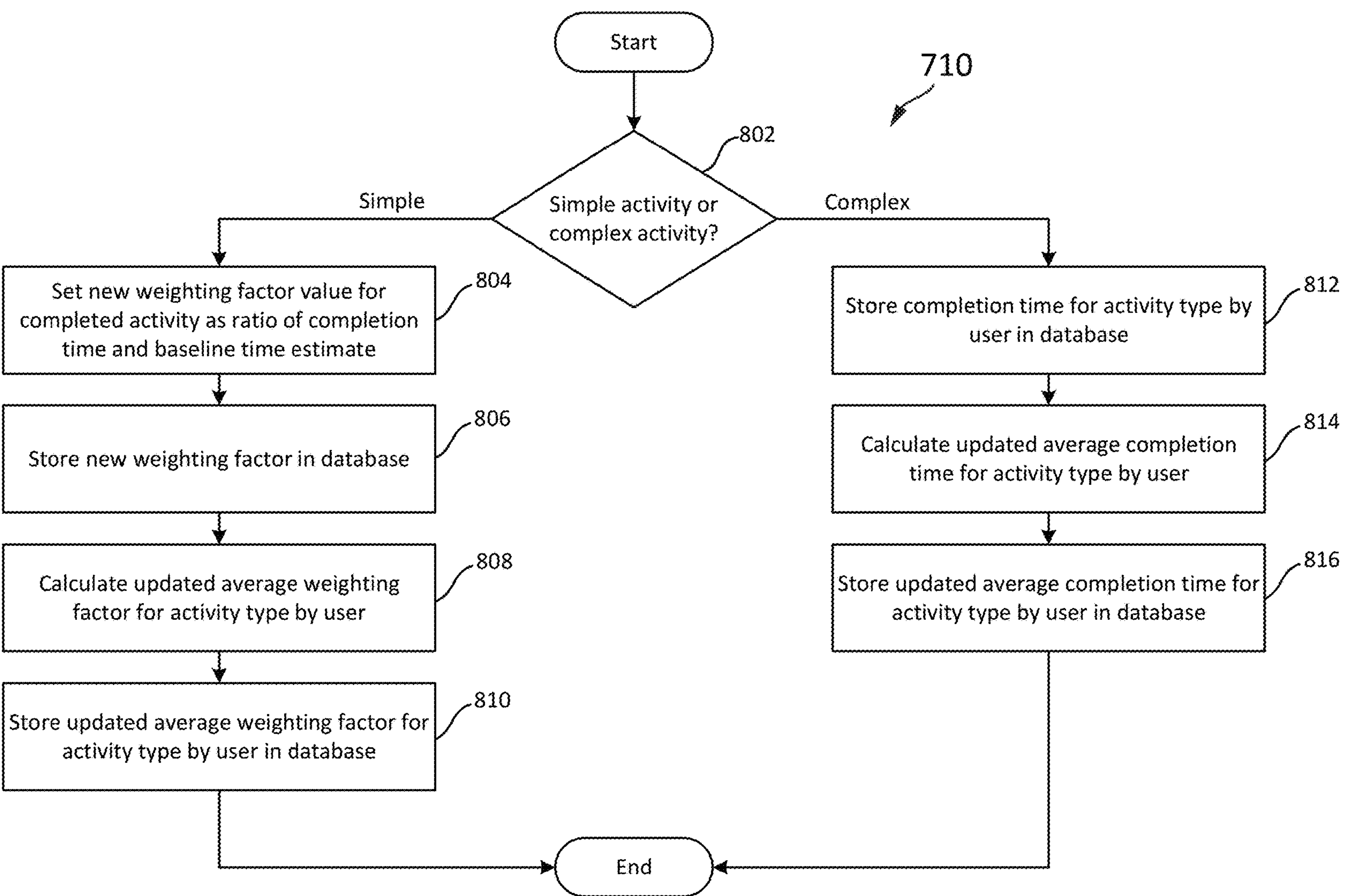
FIG. 8 is a flowchart illustrating an example implementation of one of the steps of the routine shown in FIG. 7.

FIGS. 6 and 7 are flowcharts showing example routines 600 and 700 that may be performed by the activity time reporting engine 502 and the activity time reporting service 504, respectively, of the system 500 to measure and record the amount of time a user of the resource access application 424 takes to complete an activity corresponding to a particular type of notification 106, as well as to determine a baseline time estimate (representing an amount of time an average user is expected to take to complete a particular activity) for simple activities. FIG. 8 is a flowchart illustrating an example implementation of the step 710 of the routine 700 pursuant to which various activity time estimations tables (examples of which are shown in FIGS. 9A and 9B—described below) may be updated based on the measured completion time for a particular type of activity relating to a notification 106.

Figure 12:
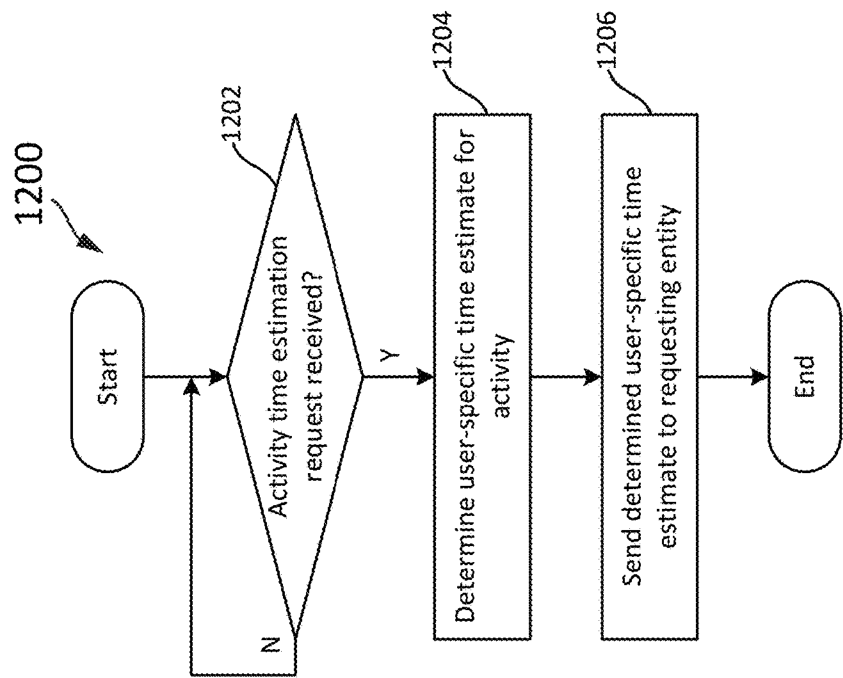
FIG. 12 is a flowchart showing an example routine that may be performed by the activity time estimation service shown in FIG. 5.
Figure 10:
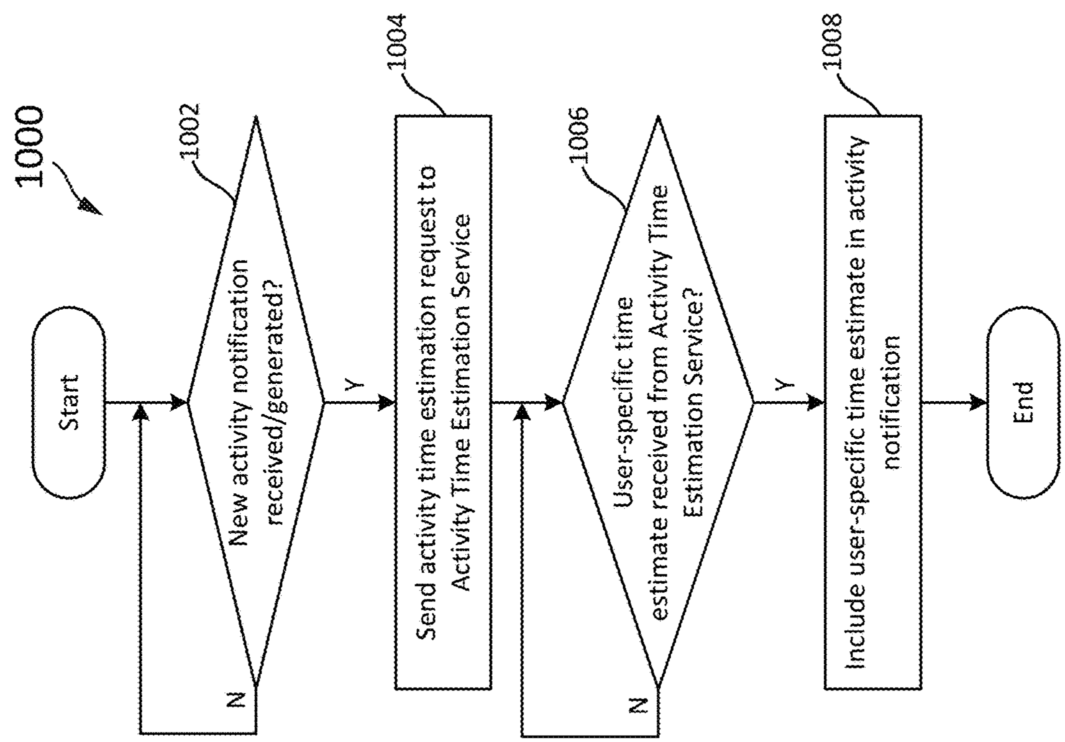
FIG. 10 is a flowchart showing an example routine that may be performed by the activity time determination engine shown in FIG. 5.
Figure 11:
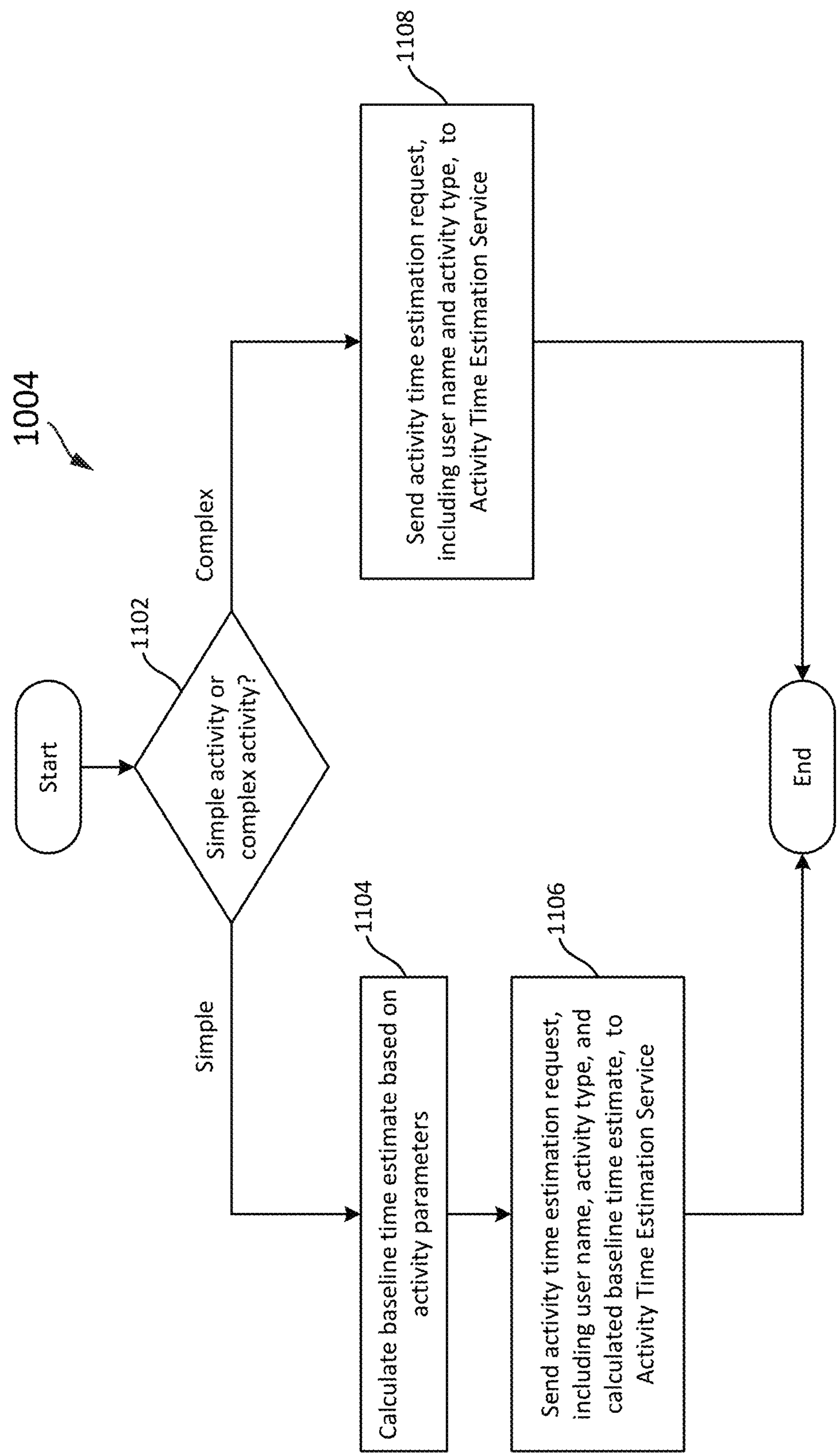
FIG. 11 is a flowchart illustrating an example implementation of one of the steps of the routine shown in FIG. 10.
Figure 13:
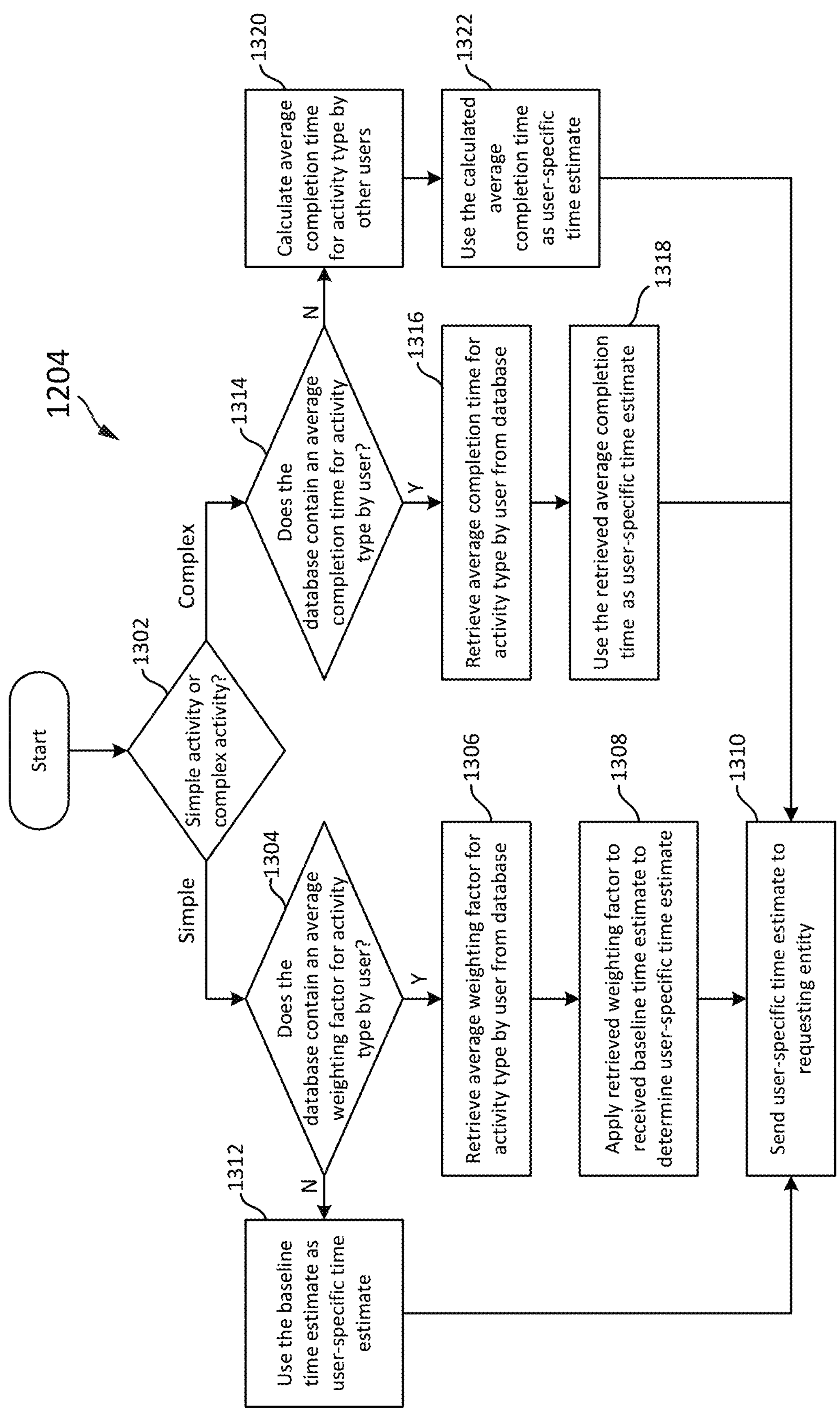
FIG. 13 is a flowchart illustrating an example implementation of one of the steps of the routine shown in FIG. 12.

FIGS. 10 and 12 are flowcharts showing example routines 1000 and 1200 that may be performed by the activity time determination engine 506 and the activity time estimation service 508, respectively, of the system 500 to determine and insert the user-specific activity time estimate indicators 134 (shown in FIG. 1B) within the notifications 106 in an activity feed 104. FIGS. 11 and 13 are flowcharts illustrating example implementations of the steps 1004 and 1204 shown in FIGS. 10 and 12, respectively.

The various steps of the routines 600, 700, 1000, and 1200 described herein may be implemented, for example, by one or more processors that execute instructions encoded on one or more computer-readable media. Such processor(s) and computer readable medium(s) may, for example, be included in or operate in conjunction with the client 202 and/or the cloud computing environment 414 described above in connection with FIG. 4C. The operation of the routines 600, 700, 1000, and 1200 will now be described in more detail.

Referring first to FIG. 6, when the activity time reporting engine 502 determines (at a decision step 602) that a user has started an activity associated with a notification 106 in an activity feed 104, the routine 600 may proceed to a step 604. As explained in connection with FIG. 4C above, the notifications 106 may be implemented, for example, using "microapps" that can read and/or write data to a system of record using application programming interface (API) functions or the like, rather than by performing a full launch of the application for that system of record. In some embodiments, the start of an activity associated with a notification 106 (as determined at the decision step 602) may correspond to the initial interaction a user has with the microapp that is used to implement the functionality of the notification 106. Such initial interaction may, for example, involve a user clicking on or otherwise selecting a portion of the notification 106 other than one of the user-interface elements 108, 110 so as to cause the resource access application 424 to display additional details concerning the event that triggered the notification 106 and/or to provide access to additional functionality enabled by the microapp corresponding to the notification 106 (e.g., in a separate pop-up window corresponding to the microapp). Additionally or alternatively, such initial interaction may correspond to a user selecting a user interface element within the notification 106 that causes the native application to which the notification 106 relates to be launched, thus allowing the user to respond to the event that prompted the notification via that native application rather than via the microapp.

At a step 604 of the routine 600, the activity time reporting engine 502 may send an "activity start message" to the activity time reporting service 504. As indicated, such an activity start message may identify the current user of the resource access application 424 in which the activity feed 104 is presented, the particular type of activity to which the notification 106 relates, and the time at which the user first interacted with the microapp corresponding to the notification 106, as described above.

At a decision step 606 of the routine 600, the activity time reporting engine 502 may determine whether the activity corresponding to the notification 106 has been completed. As noted above, as used herein, the phrase "complete an activity" refers to a user taking some action that either clears the notification 106 from the activity feed 104 or places the notification 106 in a state that apprises the user that the notification 106 no longer needs the user's attention. A user may complete an activity corresponding to a notification 106, for example, by selecting an action element 108 associated with a micro-app that indicates completion of a task, by launching the full application and taking an action responsive to the event that prompted the notification 106, or by dismissing the notification, such as by clicking a close element 110.

At a decision step 608 of the routine 600, the activity time reporting engine 502 may determine whether the activity corresponding to the notification 106 is "simple" or "complex." In some embodiments, the determination at the decision step 608 may, for example, be made by referencing a look up table that identifies the various possible activity types as either simple or complex. As discussed above in Section A, in some implementations, those tasks for which the completion time is likely to depend primarily on a quantity of content (e.g., the number of words, number of video frames, etc.) or other parameter (e.g., scheduled meeting duration) of the content itself may be designated as "simple," whereas those tasks for which the completion time is likely to depend primarily on the nature and/or extent of input the user chooses to devote to the task at hand, and may thus not be accurately estimated based on a quantity (e.g., text count, frame count) or other parameter (e.g., scheduled meeting duration) of the content to which the task relates, may be designated as "complex."

As shown in FIG. 6, when the activity time reporting engine 502 determines (at the decision step 608) that the activity is "simple," the routine 600 may proceed to a step 610, at which parameters of the activity may be used to calculate a baseline time estimate for the activity. As indicated above, such a baseline time estimate may represent the amount of time an average user is expected to take to complete an activity having the indicated parameters. Illustrative examples of formulas that may be used to calculate baseline time estimates for simple activities are as follows. For activity types involving the reading of text by the user, the formula $T_{text}=Count_{text}/Speed_{avg\_reading\_speed}$ may be used to calculate the baseline time estimate, with $T_{text}$ representing the calculated baseline time estimate to read the text, $Count_{text}$ representing the number of words or characters in the text, and $Speed_{avg\_reading\_speed}$ representing the number of words or characters per unit time (e.g., per minute) an average person is expected to read. For activity types involving the viewing of video by the user, the formula $T_{video}=Count_{video}/Speed_{avg\_viewing\_speed}$ may be used to calculate the baseline time estimate, with $T_{video}$ representing the calculated baseline time estimate to view the video, $Count_{video}$ representing the number of frames or other measurement units of the video, and $Speed_{avg\_viewing\_speed}$ representing the number of frames or other video measurement units an average person is expected view per unit time (e.g., per minute). For activity types involving scheduled meetings, the formula $T_{meeting}=Time_{end}-Time_{start}$ may be used to calculate the baseline time estimate, with $T_{meeting}$ representing the calculated baseline time estimate to participate in the meeting, $Time_{end}$ representing the scheduled ending time for the meeting, and $Time_{start}$ representing the starting time for the meeting. In some embodiments, a given notification 106 may correspond to multiple simple activity types (both the reading of text and the viewing of video), in which case respective baseline time estimates may be calculated and sent to the activity time reporting service 504 for the different activity types.

Further, although, in the example shown, baseline time estimates are calculated by the activity time reporting engine 502, it should be appreciated that, in some embodiments, the activity time reporting engine 502 may alternatively send one or more parameters for the activity to the activity time reporting service 504, so as to instead allow the activity time reporting service 504 to use such parameters to calculate such baseline time estimate(s).

At a step 612 of the routine 600, the activity time reporting engine 502 may send an "activity completion message" to the activity time reporting service 504. As indicated, such an activity completion message may indicate the "activity end time," i.e., the time at which the user completed the activity in question, as well as the baseline time estimate(s) calculated at the step 610.

As further shown in FIG. 6, when the activity time reporting engine 502 determines (at the decision step 608) that the activity is "complex," the routine 600 may proceed to a step 614, at which the activity time reporting engine 502 may send an activity completion message to the activity time reporting service 504. As indicated, such an activity completion message for a complex activity need only indicate the activity end time.

With respect to the steps 612 and 614, it should be appreciated that when the initial interaction a user has with a microapp associated with a notification 106 corresponds to the user clicking on or otherwise selecting a user interface element within the notification 106 (e.g., an action element 108 or a "close" element 110) that immediately clears the notification 106 from the activity feed 104 or places the notification 106 in a state that apprises the user that the notification 106 no longer needs the user's attention, such an interaction may be treated as both the start (corresponding to decision step 602) and the completion (corresponding to decision step 606) of the activity corresponding to such a notification 106. Accordingly, in some embodiments, only a single message may be sent to the activity time reporting service 504 in such a circumstance. Such a message may indicate simply that it took the user no time to complete the activity corresponding to the notification 106.

Moreover, although not illustrated in FIG. 6, it should also be appreciated that, in some embodiments, the activity time reporting engine 502 may also send additional messages to the activity time reporting service 504 when it is determined that the user has temporarily stopped interacting with the microapp corresponding to the notification 106 and/or when the user again resumes such interaction. For example, in some embodiments, a determination that a user has initiated interaction with a microapp associated with a different notification 106 or has accessed other functionality of the resource access application 424 that is unrelated to the notification 106 under consideration may cause the activity time reporting engine 502 to apprise the activity time reporting service 504 that the user has temporarily stopped interacting with microapp corresponding to that notification 106. A determination that the user has again interacted with microapp under consideration may subsequently cause an "interaction resumed" message to be sent to the activity time reporting service 504.

FIG. 7 shows an example routine 700 that may be executed by the activity time reporting service 504 upon receipt of an activity time start message from the activity time reporting engine 502 in accordance with the routine 600 shown in FIG. 6. As shown, when the activity time reporting service 504 determines (at a decision step 702) that an activity start message has been received from the activity time reporting engine 502, the routine 700 may proceed to a step 704, at which the activity time reporting service 504 may record (either in the database 510 or another storage medium) the information included in the received activity start message, e.g., the user's identity, the particular type of activity involved, and the start time of the activity.

Pursuant to a decision step 706 of the routine 700, the activity time reporting service 504 may proceed to a step 708 when the activity time reporting service 504 determines that an activity completion message has been received from the activity time reporting engine 502. At the step 708 of the routine 700, the activity time reporting service 504 may calculate the "activity completion time," i.e., the total amount of time it took for the user to complete the activity, e.g., by determining the difference between the activity end time (included in the activity completion message) and the previously-recorded activity start time, and perhaps also taking into account pauses in the user's interaction with the microapp under consideration, e.g., based on additional "temporary stop" and/or "resume" messages received from the activity time reporting engine 502, as described above.

At a step 710 of the routine 700, the activity completion time calculated at the step 708 may be used to update one or more activity time estimation tables (e.g., stored in the database 510) associated with the user, which tables may subsequently be used by the activity time estimation service 508 to provide user-specific and activity-specific activity time estimates to the activity time determination engine 506. An example routine that may be used to implement the step 710 in some embodiments is described below in connection with FIG. 8.

Although, in the example illustrated, the activity time reporting service 504 is responsible for calculating the activity completion time based on an "activity start message" and an "activity completion message" (and possibly also "temporary stop" and/or "resume messages") received from the activity time reporting engine 502, in some embodiments, the activity start time (and possibly temporary stop and/or resume times) may alternatively be recorded locally by the activity time reporting engine 502 and the activity completion time may also be calculated locally by the activity time reporting engine 502. In such embodiments, the activity time reporting engine 502 need not send a separate activity start message (or temporary stop and/or resume messages) to the activity time reporting service 504, and may instead simply send an activity completion message (including the calculated activity completion time) to the activity time reporting service 504 upon the activity reporting engine 502 determining that the activity has been completed.

An example routine that may be used to implement the step 710 of the routine 700 in some embodiments will now be described with reference to FIG. 8. At a decision step 802, the activity time reporting service 504 may determine whether the particular activity type with which the newly-determined activity completion time corresponds is categorized as a "simple" activity or a "complex" activity. In some embodiments, the determination at the decision step 802 may, for example, be made based on an activity type indicator included in the activity start message and/or the activity completion message received from the activity time reporting engine 502.

As shown in FIG. 8, when the activity time reporting service 504 determines (at the decision step 802) that the activity is "simple," the routine 710 may proceed to a step 804, at which a new weighting factor for the newly-completed activity may be determined. As indicated for the step 804, the new weighting factor may be set to be equal to a ratio of the actual activity completion time (e.g., as calculated at the step 708 of the routine 700—shown in FIG. 7) to the baseline time estimate (e.g., as calculated at the step 610 of the routine 600—shown in FIG. 6). At a step 806, the new weighting factor so calculated may then be stored in the database 510 of the system 500 in association with a user identifier and an indicator of the activity type to which the new weighting factor pertains. With reference to the table 902 shown in FIG. 9A, for example, the newly-calculated weighting factor may be recorded as an entry 904 (e.g., "2.0") in association with an entry 906 (e.g., "Type SA") indicating an activity type and an entry 908 (e.g., "User A") identifying the current user of the resource access application 424.

At a step 808, an updated value of an average weighting factor associated with the user and the activity type in question may be calculated, e.g., by calculating the average value of all the recorded weighting factors, including the newly-recorded weighting factor, that are associated with that user and that activity type.

At a step 810, the updated average value for the recorded weighting factors may be recorded in association with the user and the activity type. With reference to table 902, for example, an entry 910 in the table 902 may be updated to reflect the updated average weight (e.g., "1.3") associated with that user performing that particular type of activity.

As explained below in connection with step 1308 of the routine 1204 (shown in FIG. 13), the activity time estimation service 508 may subsequently apply the updated average weight recorded in the table 902 against a baseline time estimate for the corresponding activity type to determine a user-specific time estimate for a newly-received notification.

As shown in FIG. 8, when the activity time reporting service 504 determines (at the decision step 802) that the activity is "complex," the routine 710 may proceed to a step 812, at which the calculated completion time (e.g., as calculated at the step 708 of the routine 700—shown in FIG. 7) may be stored in the database 510 of the system 500 in association with a user identifier and an indicator of the activity type to which the newly-determined completion time pertains. With reference to the table 912 shown in FIG. 9B, for example, the newly-determined completion time duration may be recorded as an entry 914 (e.g., "40 mins") in association with an entry 916 (e.g., "Type CA") indicating an activity type and an entry 918 (e.g., "User A") identifying the current user of the resource access application 424.

At a step 814, an updated value of an average completion time associated with the user and the activity type in question may be calculated, e.g., by calculating the average value of all the recorded completion time durations, including the newly-recorded completion time, that are associated with that user and that activity type.

At a step 816, the updated average value for the recorded completion time durations may be recorded in association with the user and the activity type. With reference to table 912, for example, an entry 920 in the table 912 may be updated to reflect the updated average completion time duration (e.g., "37 mins") associated with that user performing that particularly type of activity.

As explained below in connection with step 1318 of the routine 1204 (shown in FIG. 13), the activity time estimation service 508 may subsequently use the updated average completion time duration recorded in the table 912 as a time estimate for a newly-received notification relating to that same type of activity by that same user.

Referring next to FIG. 10, an example routine 1000 that may be executed by the activity time determination engine 506 (shown in FIG. 5) is shown. As noted above, the activity time determination engine 506 may either be included in a client device 202 that receives notifications 106 for display in an activity feed 104 (e.g., as a component of a resource access application 424) or may instead be included in another system component (e.g., the analytics service 438) that generates notifications 106 that are to be sent to such a client device for inclusion in such an activity feed. As shown in FIG. 10, when it is determined (at a decision step 1002) that a new notification 106 has been received or generated, the routine 1000 may proceed to a step 1004, at which an activity time estimation request may be sent to the activity time estimation service 508. As illustrated in FIG. 11 (which shows an example routine that may be executed at the step 1004), the activity time determination engine 506 may (at a decision step 1102) determine whether the newly-received or newly-generated activity is a "simple" activity or a "complex" activity. The decision step 1102 is analogous to and may be implemented in the same or a similar manner as the decision step 606 of the routine 600 (shown in FIG. 6), as described above.

As shown in FIG. 11 when the activity time determination engine 506 determines (at the decision step 1102) that the activity is "simple," the routine 1004 may proceed to a step 1104, at which parameters of the activity may be used to calculate a baseline time estimate for the activity. The step 1104 is analogous to and may be implemented in the same or a similar manner as the step 610 of the routine 600 (shown in FIG. 6), as described above.

At a step 1106, the activity time determination engine 506 may send an activity time estimation request to the activity time estimation service 508. As indicated, the activity time estimation request that is so sent may include the identity of the user to whom the notification 106 in question pertains, the type of activity involved, the baseline time estimate calculated at the step 1104. In this regard, it should be appreciated that, as was the case with the activity time reporting engine 502, in some embodiments, the activity time determination engine 506 may alternatively send one or more parameters for the activity to the activity time estimation service 508, so as to instead allow the activity time estimation service 508 to use such parameters to calculate such baseline time estimate(s).

As further shown in FIG. 11, when the activity time determination engine 506 determines (at the decision step 1102) that the activity is "complex," the routine 1004 may proceed to a step 1108, at which the activity time determination engine 506 may send an activity time estimation request to the activity time estimation service 508. As indicated, for complex activities, the activity time estimation request that is so sent may simply identify the user to whom the notification 106 in question pertains as well as the type of activity involved.

Referring again to FIG. 10, the activity time determination engine 506 may (at a decision step 1006) determine whether a time estimate has been returned from the activity time estimation service 508 in response to the request that was sent at the step 1004. When the activity time determination engine 506 determines that the activity time estimation service 508 has returned an activity time estimate, the routine 1000 may proceed to a step 1008, at which a time estimate indicator 134 (shown in FIG. 1B) representing the returned activity time estimate may be inserted into the notification 106 for inclusion in the activity feed 104. As such, the notification 106 may reflect an estimate of how long it is likely to take that particular user to respond to that particular type of notification, thus improving the user's ability to interact with the activity feed 104 as discussed above.

Further, as discussed above in Section A, it should be appreciated that in some embodiments, the order and/or manner in which the notifications 106 are presented in the activity feed 104 (shown in FIG. 1B) may depend in whole or in part on the time estimates that are determined for the respective notifications 106. Accordingly, although not shown in FIG. 10, in addition to or in lieu of including the determined time estimates in the respective notifications 106 that are included in the activity feed 104 (per the step 1008), the analytics service 438 or other entity responsible for generating the activity feed 104 that is presented by way a resource access application 424 on a client 202 or otherwise, based on inputs received via the sort and/or filter user interface elements 128, 130 (shown in FIG. 1B), via interaction with a virtual assistant, via user interaction with a generated time cost estimate report, or otherwise, may use such time estimates to control the manner and/or order in which the notifications 106 are presented in the activity feed 104. Examples of situations in which the determined time estimates may be used to control and/or prioritize the manner and/or order in which the notifications 106 are presented in the activity feed 104 are described above in Section A.

FIG. 12 shows an example routine 1200 that may be performed by the activity time estimation service 508 to process activity time estimation requests that are received from the activity time determination engine 506. As shown, the activity time estimation service 508 may (at a decision step 1202) determine whether an activity time estimation request has been received from the activity time determination engine 506 (e.g., per the step 1004 of the routine 1000—shown in FIG. 10). When the activity time estimation service determines that an activity time estimation request has been received from the activity time determination engine 506, the routine 1200 may proceed to a step 1204, at which an estimated time for the particular user identified in the request to complete the particular type of activity indicated in the request may be determined. FIG. 13, described below, shows an example routine that may be performed to implement the step 1204 in some embodiments. At the step 1206, the activity time estimation service 508 may then send the determined activity time estimate to the activity time determination engine 506 for inclusion in the notification 106 associated with the activity.

Referring now to FIG. 13, the example routine 1204 will be described. As illustrated, the activity time estimation service 508 may (at a decision step 1302) determine whether the newly-received or newly-generated activity is a "simple" activity or a "complex" activity. The decision step 1302 is analogous to and may be implemented in the same or a similar manner as the decision step 802 of the routine 710 (shown in FIG. 8), as described above.

As shown in FIG. 13, when the activity time estimation service 508 determines (at the decision step 1302) that the activity is "simple," the routine 1204 may proceed to a decision step 1304, at which the activity time estimation service 508 may determine whether the database 510 includes an entry reflecting an average weighting factor corresponding to the user and activity type that were identified in the activity time estimation request received from the activity time determination engine 506.

When the activity time estimation service 508 determines (at the decision step 1304) that such an entry (e.g., entry 910 of the table 902—shown in FIG. 9A) does exist in the database 510, the routine 1204 may proceed to a step 1306, at which the average weighting factor corresponding to the user and activity type may be retrieved from the database 510.

At a step 1308, the retrieved average weighting factor may be applied against the baseline time estimate that was included in the activity time estimation request received from the activity time determination engine 506. In some implementations, for example, the activity time estimation service 508 may multiply the baseline time estimate by the weighting factor to yield a user-specific time estimate for completing the activity in question.

At a step 1310, the activity time estimation service 508 may send the determined user-specific time estimate for the identified activity to the activity time determination engine 506 that sent it the activity time estimation request.

When the activity time estimation service 508 determines (at the decision step 1304) that the database 510 does not include an entry reflecting an average weighting factor corresponding to the user and activity type that were identified in the activity time estimation request, the routine 1204 may instead proceed to a step 1312, at which the activity time estimation service 508 may use the baseline time estimate that was included in the activity time estimation request as the user-specific time estimate that is returned to the activity time determination engine 506 at the step 1310. In other words, a weighting factor of "1" may be applied against the received baseline time estimate in such a circumstance.

When the activity time estimation service 508 determines (at the decision step 1302) that the activity is "complex," the routine 1204 may proceed to a decision step 1314, at which the activity time estimation service 508 may determine whether the database 510 includes an entry reflecting an average completion time corresponding to the user and activity type that were identified in the activity time estimation request received from the activity time determination engine 506.

When the activity time estimation service 508 determines (at the decision step 1314) that such an entry (e.g., entry 920 of the table 912—shown in FIG. 9B) does exist in the database 510, the routine 1204 may proceed to a step 1316, at which the average completion time corresponding to the user and activity type may be retrieved from the database 510.

At a step 1318, the activity time estimation service 508 may use the retrieved average completion time as the user-specific time estimate that is to be sent to the activity time determination engine 506 (at the step 1310).

When the activity time estimation service 508 determines (at the decision step 1314) that the database 510 does not include an entry reflecting an average completion time corresponding to the user and activity type that were identified in the activity time estimation request, the routine 1204 may instead proceed to a step 1320, at which records associated with other users may be referenced to calculate an estimated completion time. In some implementations, for example, database records indicating the average amounts of time it took other user to complete the type of activity identified in the activity time estimation request may be accessed, and such values may be averaged together to yield a calculated average completion time for the activity type.

At the step 1322, the activity time estimation service 508 may use the average completion time calculated at the step 1320 as the user-specific time estimate that is sent to the activity time determination engine 506 (at the step 1310).

F. Example Implementations of Methods, Systems, and Computer-Readable Media in Accordance with the Present Disclosure The following paragraphs (M1) through (M11) describe examples of methods that may be implemented in accordance with the present disclosure.

(M1) A method may involve identifying a first activity a user is to complete using a computing resource; causing a client device operated by the user to output a first notification concerning the first activity, the first notification including at least one first user interface element with which the user can interact to begin the first activity; determining an estimated time for the user to complete the first activity; and causing the client device to output an indication of the estimated time in association with the first notification.

(M2) A method may be performed as described in paragraph (M1), and may further involve generating, by a computing system, the first notification in response to the computing system identifying the first activity; and sending, from the computing system to the client device, the first notification so as to cause the client device to output the first notification.

(M3) A method may be performed as described in paragraph (M2), and may further involve generating the first notification in response to the computing system identifying a first event within a first system of record, the first event corresponding to the first activity; generating a second notification in response to the computing system identifying a second event within a second system of record, the second notification including at least one second user interface element with which the user can interact to begin a second activity corresponding to the second event; and causing the first notification and the second notification to be included within a same activity feed presented on a display of the client device.

(M4) A method may be performed as described in paragraph (M2) or paragraph (M3), and may further involve receiving, by the computing system and from the client device, a request for a time estimate to complete the first activity indicated by the first notification; and sending, from the computing system to the client device, the indication of the estimated time so as to cause the client device to output the indication in association with the first notification.

(M5) A method may be performed as described in paragraph (M2) or paragraph (M3), wherein the computing system may determine the estimated time; and the indication of the estimated time may be included in the first notification that is sent from the computing system to the client device.

(M6) A method may be performed as described in any of paragraphs (M1) through (M5), wherein determining the estimated time may be performed at least in part by determining that the first activity is a first type of activity; determining a stored value associated with the user and an indicator of the first type of activity; and using the stored value to determine the estimated time.

(M7) A method may be performed as described in paragraph (M6), wherein the stored value may represent a first weighting factor, and the method may further involve determining a first baseline time estimate based at least in part on a parameter of first content associated with the first activity; and applying the first weighting factor to the first baseline time estimate to determine the estimated time.

(M8) A method may be performed as described in paragraph (M7), wherein the parameter may represent a quantity of text included in the first content, and determining the first baseline time estimate may be performed at least in part by calculating the first baseline time estimate based at least in part on the quantity of text and a baseline reading speed.

(M9) A method may be performed as described in paragraph (M7), wherein the parameter may represent a quantity of video included in the first content, and determining the first baseline time estimate may be performed at least in part by calculating the first baseline time estimate based at least in part on the quantity of video and a baseline video viewing speed.

(M10) A method may be performed as described in any of paragraphs (M7) through (M9), and may further involve determining an actual amount of time the user took to complete a second activity of the first type; determining a second baseline time estimate based at least in part on the parameter of second content associated with the second activity; and determining the first weighting factor based at least in part on the actual amount of time and the second baseline time estimate.

(M11) A method may be performed as described in paragraph (M6), wherein the stored value may represent an average amount of time the user has historically taken to complete activities of the first type, and the method may further involve determining an actual amount of time the user took to complete a second activity of the first type; and updating the average amount of time based at least in part on the actual amount of time.

The following paragraphs (S1) through (S11) describe examples of systems and devices that may be implemented in accordance with the present disclosure.

(S1) A system may comprise at least one processor, and at least one computer-readable medium encoded with instructions which, when executed by the at least one processor, cause the system to identify a first activity a user is to complete using a computing resource, to cause a client device operated by the user to output a first notification concerning the first activity, the first notification including at least one user interface element with which the user can interact to begin the first activity, to determine an estimated time for the user to complete the first activity; and to cause the client device to output an indication of the estimated time in association with the first notification.

(S2) A system may be configured as described in paragraph (S1), wherein the at least one computer-readable medium may be encoded with additional instructions which, when executed by the at least one processor, may further cause the system to generate the first notification in response to identifying the first activity, and to send, to the client device, the first notification so as to cause the client device to output the first notification.

(S3) A system may be configured as described in paragraph (S2), wherein the at least one computer-readable medium may be encoded with additional instructions which, when executed by the at least one processor, may further cause the system to generate the first notification in response to identifying a first event within a first system of record, the first event corresponding to the first activity, to generate a second notification in response to identifying a second event within a second system of record, the second notification including at least one second user interface element with which the user can interact to begin a second activity corresponding to the second event, and to cause the first notification and the second notification to be included within a same activity feed presented on a display of the client device.

(S4) A system may be configured as described in paragraph (S2) or paragraph (S3), wherein the at least one computer-readable medium may be encoded with additional instructions which, when executed by the at least one processor, may further cause the system to receive, from the client device, a request for a time estimate to complete the first activity indicated by the first notification, and to send, to the client device, the indication of the estimated time so as to cause the client device to output the indication in association with the first notification.

(S5) A system may be configured as described in paragraph (S2) or paragraph (S3), wherein the system may determine the estimated time, and the indication of the estimated time may be included in the first notification that is sent from the system to the client device.

(S6) A system may be configured as described in any of paragraphs (S1) through (S5), wherein the at least one computer-readable medium may be encoded with additional instructions which, when executed by the at least one processor, may further cause the system to determine the estimated time at least in part by determining that the first activity is a first type of activity; determining a stored value associated with the user and an indicator of the first type of activity; and using the stored value to determine the estimated time.

(S7) A system may be configured as described in paragraph (S6), wherein the stored value may represent a first weighting factor, and the at least one computer-readable medium may be encoded with additional instructions which, when executed by the at least one processor, may further cause the system to determine a first baseline time estimate based at least in part on a parameter of first content associated with the first activity, and to apply the first weighting factor to the first baseline time estimate to determine the estimated time.

(S8) A system may be configured as described in paragraph (S7), wherein the parameter may represent a quantity of text included in the first content, and the at least one computer-readable medium may be encoded with additional instructions which, when executed by the at least one processor, may further cause the system to determine the first baseline time estimate at least in part by calculating the first baseline time estimate based at least in part on the quantity of text and a baseline reading speed.

(S9) A system may be configured as described in paragraph (S7), wherein the parameter may represent a quantity of video included in the first content, and the at least one computer-readable medium may be encoded with additional instructions which, when executed by the at least one processor, may further cause the system to determine the first baseline time estimate at least in part by calculating the first baseline time estimate based at least in part on the quantity of video and a baseline video viewing speed.

(S10) A system may be configured as described in any of paragraphs (S7) through (S9), wherein the at least one computer-readable medium may be encoded with additional instructions which, when executed by the at least one processor, may further cause the system to determine an actual amount of time the user took to complete a second activity of the first type, to determine a second baseline time estimate based at least in part on the parameter of second content associated with the second activity, and to determine the first weighting factor based at least in part on the actual amount of time and the second baseline time estimate.

(S11) A system may be configured as described in paragraph (S6), wherein the stored value may represent an average amount of time the user has historically taken to complete activities of the first type, and the at least one computer-readable medium may be encoded with additional instructions which, when executed by the at least one processor, may further cause the system to determine an actual amount of time the user took to complete a second activity of the first type, and to update the average amount of time based at least in part on the actual amount of time.

The following paragraphs (CRM1) through (CRM11) describe examples of computer-readable media that may be configured in accordance with the present disclosure.

(CRM1) At least one non-transitory, computer-readable medium may be encoded with instructions which, when executed by at least one processor included in a system, cause the system to identify a first activity a user is to complete using a computing resource, to cause a client device operated by the user to output a first notification concerning the first activity, the first notification including at least one user interface element with which the user can interact to begin the first activity, to determine an estimated time for the user to complete the first activity; and to cause the client device to output an indication of the estimated time in association with the first notification.

(CRM2) At least one computer-readable medium may be configured as described in paragraph (CRM1), and may further be encoded with additional instructions which, when executed by the at least one processor, may further cause the system to generate the first notification in response to identifying the first activity, and to send, to the client device, the first notification so as to cause the client device to output the first notification.

(CRM3) At least one computer-readable medium may be configured as described in paragraph (CRM2), and may further be encoded with additional instructions which, when executed by the at least one processor, may further cause the system to generate the first notification in response to identifying a first event within a first system of record, the first event corresponding to the first activity, to generate a second notification in response to identifying a second event within a second system of record, the second notification including at least one second user interface element with which the user can interact to begin a second activity corresponding to the second event, and to cause the first notification and the second notification to be included within a same activity feed presented on a display of the client device.

(CRM4) At least one computer-readable medium may be configured as described in paragraph (CRM2) or paragraph (CRM3), and may further be encoded with additional instructions which, when executed by the at least one processor, may further cause the system to receive, from the client device, a request for a time estimate to complete the first activity indicated by the first notification, and to send, to the client device, the indication of the estimated time so as to cause the client device to output the indication in association with the first notification.

(CRM5) At least one computer-readable medium may be configured as described in paragraph (CRM2) or paragraph (CRM3), wherein the system may determine the estimated time, and the indication of the estimated time may be included in the first notification that is sent from the system to the client device.

(CRM6) At least one computer-readable medium may be configured as described in any of paragraphs (CRM1) through (CRM5), and may further be encoded with additional instructions which, when executed by the at least one processor, may further cause the system to determine the estimated time at least in part by determining that the first activity is a first type of activity; determining a stored value associated with the user and an indicator of the first type of activity; and using the stored value to determine the estimated time.

(CRM7) At least one computer-readable medium may be configured as described in paragraph (CRM6), wherein the stored value may represent a first weighting factor, and the at least one computer-readable medium may further be encoded with additional instructions which, when executed by the at least one processor, may further cause the system to determine a first baseline time estimate based at least in part on a parameter of first content associated with the first activity, and to apply the first weighting factor to the first baseline time estimate to determine the estimated time.

(CRM8) At least one computer-readable medium may be configured as described in paragraph (CRM7), wherein the parameter may represent a quantity of text included in the first content, and the at least one computer-readable medium may further be encoded with additional instructions which, when executed by the at least one processor, may further cause the system to determine the first baseline time estimate at least in part by calculating the first baseline time estimate based at least in part on the quantity of text and a baseline reading speed.

(CRM9) At least one computer-readable medium may be configured as described in paragraph (CRM7), wherein the parameter may represent a quantity of video included in the first content, and the at least one computer-readable medium may further be encoded with additional instructions which, when executed by the at least one processor, may further cause the system to determine the first baseline time estimate at least in part by calculating the first baseline time estimate based at least in part on the quantity of video and a baseline video viewing speed.

(CRM10) At least one computer-readable medium may be configured as described in any of paragraphs (CRM7) through (CRM9), and may further be encoded with additional instructions which, when executed by the at least one processor, may further cause the system to determine an actual amount of time the user took to complete a second activity of the first type, to determine a second baseline time estimate based at least in part on the parameter of second content associated with the second activity, and to determine the first weighting factor based at least in part on the actual amount of time and the second baseline time estimate.

(CRM11) At least one computer-readable medium may be configured as described in paragraph (CRM6), wherein the stored value may represent an average amount of time the user has historically taken to complete activities of the first type, and the at least one computer-readable medium may further be encoded with additional instructions which, when executed by the at least one processor, may further cause the system to determine an actual amount of time the user took to complete a second activity of the first type, and to update the average amount of time based at least in part on the actual amount of time.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

identifying a first activity a user is to complete using a computing resource;

causing a client device operated by the user to output a first notification concerning the first activity, the first notification including at least one first user interface element with which the user can interact to begin the first activity;

determining that the first activity is a first type of activity;

determining that a value is stored in association with an identifier of the user and an indicator of the first type of activity, wherein the value represents an average amount of time the user has historically taken to complete activities of the first type;

based at least in part on the value being stored in association with the identifier of the user and the indicator of the first type of activity, using the value to determine an estimated amount of time for the user to complete the first activity after beginning the first activity; and causing the client device to output an indication of the estimated amount of time in association with the first notification.

2. The method of claim 1, further comprising:

generating, by a computing system, the first notification in response to the computing system identifying the first activity; and sending, from the computing system to the client device, the first notification so as to cause the client device to output the first notification.

3. The method of claim 2, further comprising:

generating the first notification in response to the computing system identifying a first event within a first system of record, the first event corresponding to the first activity;

generating a second notification in response to the computing system identifying a second event within a second system of record, the second notification including at least one second user interface element with which the user can interact to begin a second activity corresponding to the second event; and causing the first notification and the second notification to be included within a same activity feed presented on a display of the client device.

4. The method of claim 2, further comprising:

receiving, by the computing system and from the client device, a request for a time estimate to complete the first activity indicated by the first notification; and sending, from the computing system to the client device, the indication of the estimated amount of time so as to cause the client device to output the indication in association with the first notification.

5. The method of claim 1, further comprising:

determining an actual amount of time the user took to complete the first activity; and updating the average amount of time based at least in part on the actual amount of time.

6. A system, comprising:

at least one processor; and at least one computer-readable medium encoded with instructions which, when executed by the at least one processor, cause the system to:

identify a first activity a user is to complete using a computing resource;

cause a client device operated by the user to output a first notification concerning the first activity, the first notification including at least one user interface element with which the user can interact to begin the first activity;

determine that the first activity is a first type of activity;

calculate a first baseline time estimate based at least in part on (A) a quantity of video associated with the first activity and a baseline video viewing speed, or (B) a quantity of text associated with the first activity and a baseline reading speed;

determine that a weighting factor is stored in association with an identifier of the user and an indicator of the first type of activity;

based at least in part on the weighting factor being stored in association with the identifier of the user and the indicator of the first type of activity, applying the weighting factor to the first baseline time estimate to determine an estimated amount of time for the user to complete the first activity after beginning the first activity; and cause the client device to output an indication of the estimated amount of time in association with the first notification.

7. The system of claim 6, wherein the at least one computer-readable medium is encoded with instructions which, when executed by the at least one processor, cause the system to:

calculate the first baseline time estimate based at least in part on the quantity of video associated with the first activity and the baseline video viewing speed.

8. The system of claim 7, wherein the at least one computer-readable medium is encoded with additional instructions which, when executed by the at least one processor, further cause the system to:

generate the first notification in response to identifying the first activity; and send, to the client device, the first notification so as to cause the client device to output the first notification.

9. The system of claim 8, wherein the at least one computer-readable medium is encoded with additional instructions which, when executed by the at least one processor, further cause the system to:

generate the first notification in response to identifying a first event within a first system of record, the first event corresponding to the first activity;

generate a second notification in response to identifying a second event within a second system of record, the second notification including at least one second user interface element with which the user can interact to begin a second activity corresponding to the second event; and cause the first notification and the second notification to be included within a same activity feed presented on a display of the client device.

10. The system of claim 8, wherein the at least one computer-readable medium is encoded with additional instructions which, when executed by the at least one processor, further cause the system to:

receive, from the client device, a request for a time estimate to complete the first activity indicated by the first notification; and send, to the client device, the indication of the estimated amount of time so as to cause the client device to output the indication in association with the first notification.

11. The system of claim 8, wherein: the indication of the estimated amount of time is included in the first notification that is sent from the system to the client device.

12. The system of claim 6, wherein the at least one computer-readable medium is encoded with instructions which, when executed by the at least one processor, cause the system to:

calculate the first baseline time estimate based at least in part on the quantity of text associated with the first activity and the baseline reading speed.

13. The system of claim 12, wherein the at least one computer-readable medium is encoded with additional instructions which, when executed by the at least one processor, further cause the system to:

generate the first notification in response to identifying the first activity; and send, to the client device, the first notification so as to cause the client device to output the first notification.

14. The system of claim 12, wherein the at least one computer-readable medium is encoded with additional instructions which, when executed by the at least one processor, further cause the system to:

generate the first notification in response to identifying a first event within a first system of record, the first event corresponding to the first activity;

generate a second notification in response to identifying a second event within a second system of record, the second notification including at least one second user interface element with which the user can interact to begin a second activity corresponding to the second event; and cause the first notification and the second notification to be included within a same activity feed presented on a display of the client device.

15. The system of claim 12, wherein the at least one computer-readable medium is encoded with additional instructions which, when executed by the at least one processor, further cause the system to:

receive, from the client device, a request for a time estimate to complete the first activity indicated by the first notification; and send, to the client device, the indication of the estimated amount of time so as to cause the client device to output the indication in association with the first notification.

16. At least one non-transitory computer-readable medium encoded with instructions which, when executed by at least one processor included in a system, cause the system to:

determine an actual amount of time that a user took to complete a first activity of a first activity type;

determine a first baseline time estimate based at least in part on a parameter of first content associated with the first activity;

determine a weighting factor based at least in part on the actual amount of time and the first baseline time estimate;

storing the weighting factor in association with an identifier of the user and an indicator of the first activity type;

identify a second activity the user is to complete using a computing resource;

cause a client device operated by the user to output a first notification concerning the second activity, the first notification including at least one user interface element with which the user can interact to begin the second activity;

determining that the second activity is of the first activity type;

determine that the weighting factor is stored in association with the identifier of the user and the indicator of the first activity type;

determine a second baseline time estimate based at least in part on the parameter of second content associated with the second activity;\ based at least in part on the weighting factor being stored in association with the identifier of the user and the indicator of the first activity type, applying the weighting factor to the second baseline time estimate to determine an estimated amount of time for the user to complete the second activity after beginning the second activity; and cause the client device to output an indication of the estimated amount of time in association with the first notification.

17. The at least one non-transitory computer-readable medium of claim 16, further encoded with additional instructions which, when executed by the at least one processor, further cause the system to:

generate the first notification in response to identifying the second activity; and send, to the client device, the first notification so as to cause the client device to output the first notification.

18. The at least one non-transitory computer-readable medium of claim 17, further encoded with additional instructions which, when executed by the at least one processor, further cause the system to:

generate the first notification in response to identifying a first event within a first system of record, the first event corresponding to the second activity; generate a second notification in response to identifying a second event within a second system of record, the second notification including at least one second user interface element with which the user can interact to begin a third activity corresponding to the second event; and cause the first notification and the second notification to be included within a same activity feed presented on a display of the client device.

19. The at least one non-transitory computer-readable medium of claim 17, further encoded with additional instructions which, when executed by the at least one processor, further cause the system to:

receive, from the client device, a request for a time estimate to complete the second activity indicated by the first notification; and send, to the client device, the indication of the estimated amount of time so as to cause the client device to output the indication in association with the first notification.

20. The at least one non-transitory computer-readable medium of claim 17, wherein the indication of the estimated amount of time is included in the first notification that is sent from the system to the client device.

* * * * *